United States Patent
Koppens

(10) Patent No.: US 11,943,606 B2
(45) Date of Patent: Mar. 26, 2024

(54) APPARATUS AND METHOD FOR DETERMINING VIRTUAL SOUND SOURCES

(71) Applicant: KONINKLIJKE PHILIPS N.V., Eindhoven (NL)

(72) Inventor: Jeroen Gerardus Henricus Koppens, Nederweert (NL)

(73) Assignee: Koninklijke Philips N.V., Eindhoven (NL)

(*) Notice: Subject to any disclaimer, the term of this patent is extended or adjusted under 35 U.S.C. 154(b) by 25 days.

(21) Appl. No.: 17/777,634

(22) PCT Filed: Nov. 12, 2020

(86) PCT No.: PCT/EP2020/081815
§ 371 (c)(1),
(2) Date: May 18, 2022

(87) PCT Pub. No.: WO2021/104881
PCT Pub. Date: Jun. 3, 2021

(65) Prior Publication Data
US 2023/0007426 A1    Jan. 5, 2023

(30) Foreign Application Priority Data
Nov. 28, 2019   (EP) .................................. 19212064

(51) Int. Cl.
*H04S 7/00* (2006.01)
*G06F 3/01* (2006.01)

(52) U.S. Cl.
CPC .............. *H04S 7/303* (2013.01); *G06F 3/011* (2013.01); *H04S 2420/01* (2013.01)

(58) Field of Classification Search
CPC ....... H04S 7/303; H04S 2420/01; G06F 3/011
USPC .......................................................... 381/303
See application file for complete search history.

(56) References Cited

U.S. PATENT DOCUMENTS

2013/0223658 A1*  8/2013  Betlehem ................. H04R 5/02
                                                              381/307

FOREIGN PATENT DOCUMENTS

| CN | 103813260 A | 5/2014 |
| JP | 08286690 A | 11/1996 |

OTHER PUBLICATIONS

J.B. Allen et al "Image Method for Efficiently Simulating Small-Room Acoustics" The Journal of The Acoustical Soc. of America, vol. 65, No. 4 Apr. 1, 1979, pp. 943-950.
Vera Erbes et al "Extending the Closed Form Image Source Model for Source Directivity" Proceedings DAGA 2018, p. 1298-1301.
International Search Report and Written Opinion from PCT/EP2020/081815 dated Jan. 26, 2021.
S. McGovern "Fast Image Method for Impulse Response Calculations of Box-Shaped Rooms" Applied Acoustics 70 (2009) p. 182-189.

(Continued)

*Primary Examiner* — Paul Kim

(57) ABSTRACT

An acoustic image source model for early reflections in a room is generated by iteratively mirroring (305) rooms around boundaries (e.g. walls) of rooms of the previous iteration. The boundaries around which to mirror in each iteration is determined (303) by a specific selection criterion including requiring that mirror directions cannot be reversed, cannot be in an excluded direction and cannot be repeated unless in a continuous series of mirrorings.

20 Claims, 7 Drawing Sheets

(56) References Cited

OTHER PUBLICATIONS

Jean-Marc Jot and Antoine Chaigne, "Digital delay networks for designing artificial reverberators", 90th AES Convention, 1991, pp. 1-16.
Jean-Marc Jot, "An analysis/synthesis approach to real-time artificial reverberation", Proc. ICASSP-92, 1992, vol. 2, pp. 221-224.
Fritz Menzer and Christof Faller, "Binaural reverberation using a modified Jot reverberator with frequency dependent interaural coherence matching", 126th AES Convention Munich, May 2009, pp. 1-6.
M. Aretz et al "Application of the Mirror Source Method for Low Frequency Sound Prediction in Rectangular Rooms" Acta Acoustica United with Acustica. vol. 100, No. 2, Mar./Apr. 2014 pp. 306-319.
F.P. Mechel "Improved Mirror Source Method in Room Acoustics" Journal of Sound and Vibration (2002) 256(5) p. 873-940.

* cited by examiner

APPARATUS AND METHOD FOR DETERMINING VIRTUAL SOUND SOURCES

CROSS-REFERENCE TO PRIOR APPLICATIONS

This application is the U.S. National Phase application under 35 U.S.C. § 371 of International Application No. PCT/EP2020/081815, filed on Nov. 12, 2020, which claims the benefit of EP Patent Application No. EP 19212064.0, filed on Nov. 28, 2019. These applications are hereby incorporated by reference herein.

FIELD OF THE INVENTION

The invention relates to an apparatus and method for determining virtual sound sources representing reflections of a sound source in a room, and in particular, but not exclusively, to virtual sound source for rendering audio in an Augmented/Virtual Reality application.

BACKGROUND OF THE INVENTION

The variety and range of experiences based on audiovisual content have increased substantially in recent years with new services and ways of utilizing and consuming such content continuously being developed and introduced. In particular, many spatial and interactive services, applications and experiences are being developed to give users a more involved and immersive experience.

Examples of such applications are Virtual Reality (VR), Augmented Reality (AR), and Mixed Reality (MR) applications which are rapidly becoming mainstream, with a number of solutions being aimed at the consumer market. A number of standards are also under development by a number of standardization bodies. Such standardization activities are actively developing standards for the various aspects of VR/AR/MR systems including e.g. streaming, broadcasting, rendering, etc.

VR applications tend to provide user experiences corresponding to the user being in a different world/environment/scene whereas AR (including Mixed Reality MR) applications tend to provide user experiences corresponding to the user being in the current environment but with additional information or virtual objects or information being added. Thus, VR applications tend to provide a fully immersive synthetically generated world/scene whereas AR applications tend to provide a partially synthetic world/scene which is overlaid the real scene in which the user is physically present. However, the terms are often used interchangeably and have a high degree of overlap. In the following, the term Virtual Reality/VR will be used to denote both Virtual Reality and Augmented/Mixed Reality.

As an example, a service being increasingly popular is the provision of images and audio in such a way that a user is able to actively and dynamically interact with the system to change parameters of the rendering such that this will adapt to movement and changes in the user's position and orientation. A very appealing feature in many applications is the ability to change the effective viewing position and viewing direction of the viewer, such as for example allowing the viewer to move and "look around" in the scene being presented.

Such a feature can specifically allow a virtual reality experience to be provided to a user. This may allow the user to (relatively) freely move about in a virtual environment and dynamically change his position and where he is looking. Typically, such virtual reality applications are based on a three-dimensional model of the scene with the model being dynamically evaluated to provide the specific requested view. This approach is well known from e.g. game applications, such as in the category of first person shooters, for computers and consoles.

It is also desirable, in particular for virtual reality applications, that the image being presented is a three-dimensional image. Indeed, in order to optimize immersion of the viewer, it is typically preferred for the user to experience the presented scene as a three-dimensional scene. Indeed, a virtual reality experience should preferably allow a user to select his/her own position, camera viewpoint, and moment in time relative to a virtual world.

In addition to the visual rendering, most VR/AR applications further provide a corresponding audio experience. In many applications, the audio preferably provides a spatial audio experience where audio sources are perceived to arrive from positions that correspond to the positions of the corresponding objects in the visual scene. Thus, the audio and video scenes are preferably perceived to be consistent and with both providing a full spatial experience.

For example, many immersive experiences are provided by a virtual audio scene being generated by headphone reproduction using binaural audio rendering technology. In many scenarios, such headphone reproduction may be based on headtracking such that the rendering can be made responsive to the user's head movements, which highly increases the sense of immersion.

However, in order to provide a highly immersive, personalized, and natural experience to the user, it is important that the rendering of the audio scene is as realistic as possible, and for combined audiovisual experiences, such as many VR experiences, it is important that the audio experience closely matches that of the visual experience, i.e. that the rendered audio scene and video scene closely match.

In order to provide a high quality experience, and in particular for the audio to be perceived as being realistic, it is important that the acoustic environment is characterized by an accurate and realistic model. This is required whether the audio scene being presented is a purely virtual scene or whether the scene is desired to correspond to a specific real-world scene.

In simulating room acoustics, or more generally environment acoustics, the reflections of sound waves on the walls, floor and ceiling of an environment (if they exist), cause delayed and attenuated (typically frequency dependent) versions of the sound source signal to reach the listener from different directions. This causes an impulse response that will be referred to as a Room Impulse Response (RIR).

As illustrated in FIG. 1, the room impulse response consists of a direct sound/anechoic part that depends on the distance of the sound source to the listener, followed by a reverberant portion that characterizes the acoustic properties of the room. The size and shape of the room, the position of the sound source and listener in the room and the reflective properties of the room's surfaces all play a role in the characteristics of this reverberant portion.

The reverberant portion can be broken down into two temporal regions, usually overlapping. The first region contains so-called early reflections, which are isolated reflections of the sound source on walls or obstacles inside the room before reaching the listener. As the time lag increases, the number of reflections present in a fixed time interval increases, now also containing secondary reflections and higher orders.

The second region in the reverberant portion is the part where the density of these reflections increases to a point that they cannot be isolated and separated by the human brain. This region is called the diffuse reverberation, late reverberation, or reverberation tail.

The reverberant portion contains cues that give the auditory system information about the distance of the source, size and acoustical properties of the room. The energy of the reverberant portion in relation to that of the anechoic portion largely determines the perceived distance of the sound source. The level and delay of the earliest reflections may give cues about how close the sound source is to a wall, and its filtering by anthropometrics may strengthen the assessment of which wall, floor or ceiling.

The density of the (early-) reflections contributes to the perceived size of the room. The time that it takes for the reflections to drop 60 dB in energy level, indicated by $T_{60}$, reverberation time, are a measure for how fast reflections dissipate in the room. The reverberation time gives information on the acoustical properties of the room; whether its walls are very reflective (e.g. bathroom) or there is much absorption of sound (e.g. bedroom with furniture, carpet and curtains).

For reverberation to provide an immersive experience, multiple RIRs are needed to express the direction from which the reflections reach the listener. These may be associated with a loudspeaker setup where each RIR is related to one of the speakers at a known position. Panning algorithms like VBAP may be employed to generate the RIRs from the known directions of the reflections.

Furthermore, immersive RIRs may be dependent on a user's anthropometric properties when it is a part of a Binaural Room Impulse Response (BRIR), due to the RIR being filtered by the head, ears and shoulders; i.e. the Head Related Impulse Responses (HRIRs).

The reflections in the late reverberation cannot be isolated anymore, and can therefore be simulated parametrically with, e.g., a parametric reverberator such as a feedback delay network like the Jot reverberator. For early reflections, the direction of incidence and distance dependent delays are important cues to humans to extract information about the room and the relative position of the sound source. Therefore, the simulation of early reflections must be more explicit than the late reverberation for a realistic immersive experience.

One approach to modelling early reflections is to mirror the sound sources in each of the room's boundaries to generate virtual sound sources that represent the reflections. Such a model is known as an image-source model and is described in Allen J B, Berkley D A. "Image method for efficiently simulating small-room acoustics". The Journal of the Acoustical Society of America 1979; 65(4):943-50. However, although such a model may provide an efficient and high-quality modelling of early reflections, compared to less room-shape limited approaches such as ray-tracing or finite element modelling, it also tends to have some disadvantages. Specifically, it still tends to be relatively complex and to have a unnecessarily high computational resource requirement, especially in order to find the virtual sources of the reflections. For example, the process may result in many duplicates of the source being generated that need to be further considered, processed, decimated. The disadvantages tend to increase the higher the number of reflections that are considered and in many practical applications the number of reflections are accordingly limited leading to reduced accuracy and quality of the model.

Hence, an improved model and approach for generating virtual sources representing reflections would be advantageous. In particular, an approach/model that allows improved operation, increased flexibility, reduced complexity, facilitated implementation, an improved audio experience, a reduced complexity, reduced computational burden, improved audio quality, improved model accuracy and quality, and/or improved performance and/or operation would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided method of determining virtual sound sources representing reflections of a first sound source in a first room, the method comprising a computer performing the steps of: receiving data describing boundaries of the first room and a sound source position for the first sound source in the room; iteratively determining the virtual sound sources as mirrored sound sources by performing sound source mirroring of sound sources determined in a previous iteration, each iteration comprising, for each source room of a set of source rooms comprising mirror rooms determined in an immediately previous iteration, performing the steps of: determining a set of mirror boundaries for the source room; for each mirror boundary of the set of mirror boundaries determining a mirror room by mirroring the source room around the mirror boundary, and determining a mirror sound source by mirroring a source sound source around the mirror boundary, the source sound source being a mirror sound source of the source room, the mirroring having a direction of mirroring from the source room to the mirror room; wherein the determining of the set of mirror boundaries includes selecting boundaries of the source room in accordance with a selection criterion comprising: a requirement that for a candidate boundary of the source room to be included in the set of mirror boundaries, a first direction of mirroring for the candidate boundary must not be in an opposite direction of a direction of mirroring for any previous mirroring leading to the source room; a requirement that for the candidate boundary to be included in the set of mirror boundaries, the first direction must not be in an excluded direction, the excluded direction being dependent on a boundary of the first room around which mirroring leading to the source room was performed; and a requirement that for the candidate boundary to be included in the set of mirror boundaries, the first direction must not be in a same direction as any direction of mirroring for any previous mirroring leading to the source room except for a direction of mirroring of a mirroring generating the source room in the immediately previous iteration.

The invention may provide improved and/or facilitated determination of virtual sound sources representing reflections in a room. The approach may allow a facilitated and/or more efficient generation of a model for early reflections in a room. The approach may in many embodiments prevent duplicate virtual sound sources to be generated. The approach may in many embodiments allow an accurate model representing reflections in a room to be generated with reduced computational requirements and/or reduced complexity.

The first room may be represented as a two dimensional rectangle and/or a three dimensional rectangle. The first room may be a two-dimensional or three-dimensional orthotope, also known as a right rectangular prism, rectangular cuboid, or rectangular parallelepiped.

A boundary for the room may be a planar element demarcating/delimiting/bounding the room, such as a wall, floor or ceiling. A boundary may be an acoustically reflective element, or may e.g. in some cases be a virtual or theoretical (arbitrary) delineation of a boundary where no (significantly) acoustically reflective element is present.

A room may be any acoustic environment demarcated by substantially planar and typically acoustically reflective elements. The planar elements may be pairwise parallel, and a two dimensional room may comprise two such parallel pairs and a three dimensional room may comprise three such parallel pairs (corresponding to four walls, a floor and a ceiling).

The mirroring of a sound source across a boundary may correspond to determining a mirrored sound source position by mirroring the sound source position of the source sound source around the boundary.

Specifically, the method may include determining a mirror sound source position for a reflection sound source in the mirror room by mirroring a reflection sound source position for the sound source of the source room around the boundary.

In accordance with an optional feature of the invention, the selection criterion comprises a requirement that if a second direction of mirroring for any previous mirroring leading to the source room is perpendicular to the excluded direction and to a mirror direction of the mirroring for the first room leading to the source room, then for the candidate boundary to be included in the set of mirror boundaries, the first direction must be the same as the second direction.

The approach may in many embodiments provide an efficient generation of a model for representing three dimensional reflections in a three dimensional room. The approach may (together with other requirements) typically prevent generation of duplicate sound sources and may typically allow all virtual sound sources corresponding to a given order of reflections to be represented by a generated virtual sound source.

In accordance with an optional feature of the invention, the first room has a pair of reference directions of mirroring being in opposite directions, and the selection criterion comprises a requirement that if a second direction of mirroring for any previous mirroring leading to the source room is in a direction belonging to the pair of associated reference directions of mirroring, then for the candidate boundary to be included in the set of mirror boundaries, the first direction must be the same as the second direction.

The approach may in many embodiments provide an efficient generation of a model for representing three dimensional reflections in a three dimensional room. The approach may (together with other requirements) typically prevent generation of duplicate sound sources and may typically allow all virtual sound sources corresponding to a given order of reflections to be represented by a generated virtual sound source.

The pair of reference directions of mirroring may be directions of two parallel boundaries of the first room. The pair of reference directions of mirroring may be a predetermined pair of reference directions of mirroring.

In some embodiments, two opposing boundaries of the first room may be designated as reference boundaries having reference mirror directions, and the selection criterion may comprise a requirement that for the candidate boundary to be included in the set of mirror boundaries then the first direction must be a reference mirror direction if a previous mirroring leading to the source room has been in the reference mirror direction.

In accordance with an optional feature of the invention, for a first iteration the first room is designated a source room of the set of source rooms for the first iteration.

This may provide an advantageous approach for initializing/starting the iterative generation of virtual sound sources.

In accordance with an optional feature of the invention, all boundaries of the first room are included in the set of mirror boundaries for the first iteration.

This may provide improved performance and/or reduced complexity/resource usage in many embodiments. It may typically allow an improved model to be generated with reduced complexity and computational resource usage. Furthermore, it may provide an advantageous approach for initializing/starting the iterative generation of virtual sound sources.

In accordance with an optional feature of the invention, each boundary of the first room is associated with an attenuation factor, and the method comprises determining a combined attenuation factor for each mirror sound source by combining attenuation factors for all boundaries included in mirroring leading to the mirror room comprising the mirror sound source.

This may provide an improved model that can provide a more realistic audio rendering.

In accordance with an optional feature of the invention, the selection criterion comprises a requirement that for the candidate boundary to be included in the set of mirror boundaries, a combined attenuation factor for the source sound source combined with an attenuation factor for the candidate boundary must indicate an attenuation below a threshold.

This may provide an improved model in many embodiments.

In accordance with an optional feature of the invention, the combined attenuation factor is frequency dependent.

This may provide an improved model in many embodiments.

In accordance with an optional feature of the invention, an attenuation factor for an acoustically non-reflective boundary is indicative of complete attenuation.

This may provide an improved model in many embodiments.

In accordance with an optional feature of the invention, the method further comprises rendering (309) an audio signal for a listening position in the first room, the audio signal including at least one audio component representing audio from at least one mirror audio source arriving at the listening position.

The approach may provide improved audio rendering and specifically a more accurate rendering of early reflections.

In accordance with an optional feature of the invention, the set of mirror boundaries include all boundaries that meet the selection criterion.

This may provide improved performance and/or reduced complexity/resource usage in many embodiments. It may typically allow an improved model to be generated with reduced complexity and computational resource usage.

In accordance with an optional feature of the invention, a predetermined number of iterations are performed.

This may provide improved performance and/or reduced complexity/resource usage in many embodiments. It may typically allow an improved model to be generated with reduced complexity and computational resource usage.

In accordance with an optional feature of the invention, the first room is an orthotope.

According to an aspect of the invention there is provided an apparatus for determining virtual sound sources representing reflections of a first sound source in a first room, the apparatus comprising: a receiver for receiving data describing boundaries of the first room and a sound source position for the first sound source in the room; a processing circuit for iteratively determining the virtual sound sources as mirrored sound sources by performing sound source mirroring of sound sources determined in a previous iteration, each iteration comprising, for each source room of a set of source rooms comprising mirror rooms determined in an immediately previous iteration, performing the steps of: determining a set of mirror boundaries for the source room; for each mirror boundary of the set of mirror boundaries determining a mirror room by mirroring the source room around the mirror boundary, and determining a mirror sound source by mirroring a source sound source around the mirror boundary, the source sound source being a mirror sound source of the source room, the mirroring having a direction of mirroring from the source room to the mirror room; wherein the determining of the set of mirror boundaries includes selecting boundaries of the source room in accordance with a selection criterion comprising: a requirement that for a candidate boundary of the source room to be included in the set of mirror boundaries, a first direction of mirroring for the candidate boundary must not be in an opposite direction of a direction of mirroring for any previous mirroring leading to the source room; a requirement that for the candidate boundary to be included in the set of mirror boundaries, the first direction must not be in an excluded direction, the excluded direction being dependent on a boundary of the first room around which mirroring leading to the source room was performed; and a requirement that for the candidate boundary to be included in the set of mirror boundaries, the first direction must not be in a same direction as any direction of mirroring for any previous mirroring leading to the source room except for a direction of mirroring of a mirroring generating the source room in the immediately previous iteration.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Audio rendering aimed at providing natural and realistic effects to a listener typically includes rendering of an acoustic environment. The rendering is based on a model of the acoustic environment which typically includes modelling a direct path, (early) reflections, and reverberation. The following description will focus on an efficient approach for generating a suitable model for (early) reflections in a real or virtual room.

Figure 1:
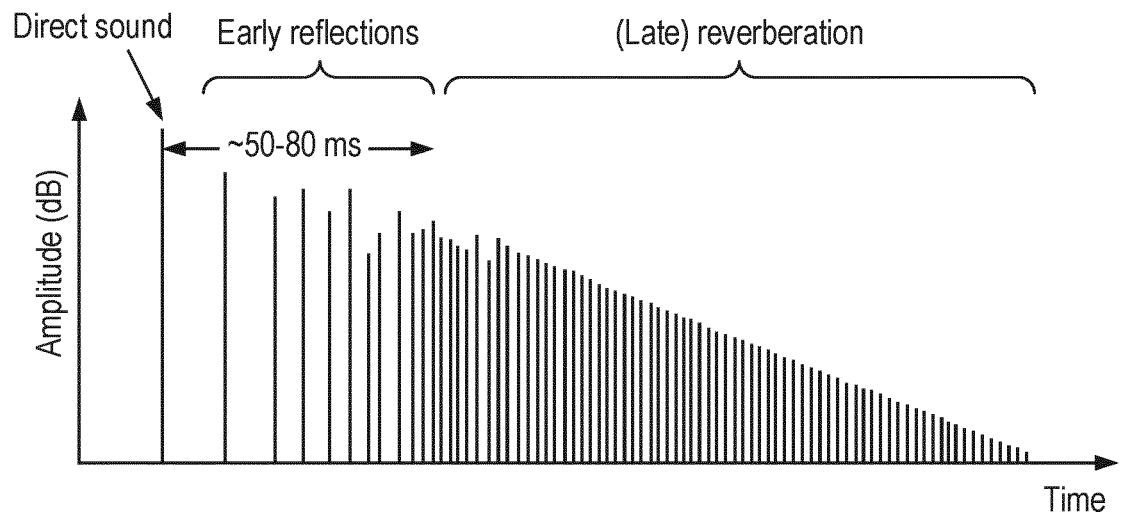
FIG. 1 illustrates an example of a components of an acoustic room response.
Figure 2:
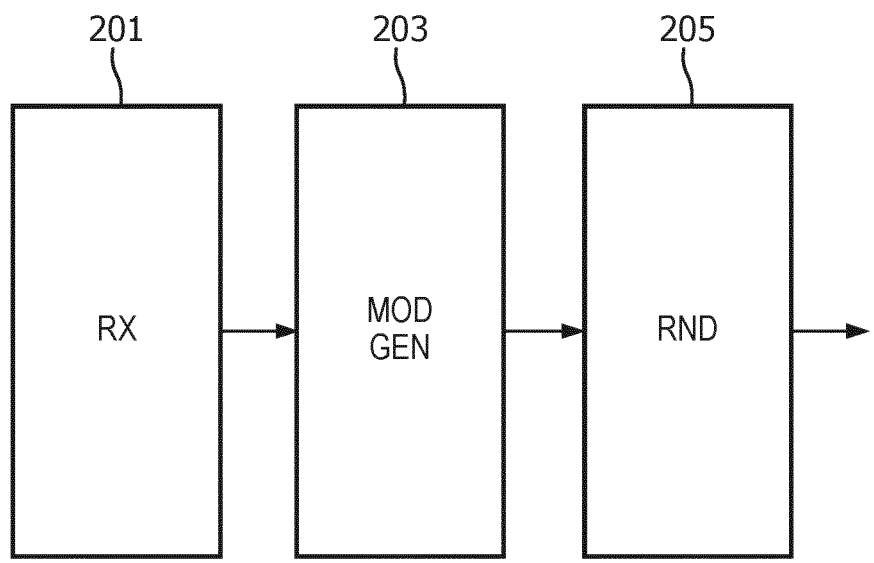
FIG. 2 illustrates an example of elements of an apparatus in accordance with some embodiments of the invention.

The approach will be described with reference to an audio rendering apparatus as disclosed in FIG. 2. The audio rendering apparatus comprises a receiver 201 which is arranged to receive room data characterizing a room which represents an acoustic environment to be emulated by the rendering. The room data specifically describes boundaries of the first room as well as at least one sound source position for a sound source in the room. The room will in the following also be referred to as the original room (or the first room) and the sound source in the original room will also be referred to as the original sound source in order to differentiate to generated virtual (mirrored) rooms and virtual (mirrored) sound sources generated for the described reflection model.

The receiver 201 may be implemented in any suitable way including e.g. using discrete or dedicated electronics. The processing circuit 203 may for example be implemented as an integrated circuit such as an Application Specific Integrated Circuit (ASIC). In some embodiments, the circuit may be implemented as a programmed processing unit, such as for example as firmware or software running on a suitable processor, such as a central processing unit, digital signal processing unit, or microcontroller etc. It will be appreciated that in such embodiments, the processing unit may include on-board or external memory, clock driving circuitry, interface circuitry, user interface circuitry etc. Such circuitry may further be implemented as part of the processing unit, as integrated circuits, and/or as discrete electronic circuitry.

The receiver 201 may receive the room data from any suitable source and in any suitable form, including e.g. as part of an audio signal. The room data may be received from an internal or external source. The receiver 201 may for example be arranged to receive the room data via a network connection, radio connection, or any other suitable connection to an internal source. In many embodiments, the receiver may receive the data from a local source, such as a local memory. In many embodiments, the receiver 201 may for example be arranged to retrieve the room data from local memory, such as local RAM or ROM memory.

The boundaries define the outline of the room and typically represent walls, ceiling, and floor (or for a 2D application typically only walls). The room is a 2D or 3D orthopod, such as a 2D rectangle or 3D rectangle. The boundaries are pairwise parallel and are substantially planar. Further the boundaries of one pair of parallel boundaries is perpendicular to the boundaries of the other pair(s) of parallel boundaries. The boundaries specifically define an orthopod (2D or 3D). The boundaries may reflect any physical property, such as any material etc. The boundaries may also represent any acoustic property.

The room being described by the room data corresponds to the intended acoustic environment for the rendering and as such may represent a real room/environment or a virtual room/environment. The room may be any region/area/environment which can be delimited/demarcated by four (for 2D) or six (for 3D) substantially planar boundaries that are pairwise parallel and substantially perpendicular between the pairs. The room data may in some embodiments represent a suitable approximation of an intended room that is not pairwise parallel and/or exhibiting right angles between connected boundaries.

In most embodiments, the room data may further include acoustic data for one, more, or typically all of the boundaries. The acoustic property data may specifically include a reflection attenuation measure for each wall which indicates the attenuation caused by the boundary when sound is reflected by the boundary. Alternatively, a reflection coefficient may indicate the portion of signal energy that is reflected in a specular reflection off of the boundary surface. In many embodiments, the attenuation measure may be frequency dependent to model that the reflection may be different for different frequencies. Furthermore, the acoustic property may be dependent on the position on the boundary surface.

The receiver 201 is coupled to a processing circuit 203 which is arranged to generate a reflection model for the room/acoustic environment representing the (early) reflections in the room and allowing these to be emulated when performing the rendering. Specifically, the processing circuit 203 is arranged to determine virtual sound sources that represent reflections of the original sound source in the original room.

The processing circuit 203 may be implemented in any suitable form including e.g. using discrete or dedicated electronics. The processing circuit 203 may for example be implemented as an integrated circuit such as an Application Specific Integrated Circuit (ASIC). In some embodiments, the circuit may be implemented as a programmed processing unit, such as for example as firmware or software running on a suitable processor, such as a central processing unit, digital signal processing unit, or microcontroller etc. It will be appreciated that in such embodiments, the processing unit may include on-board or external memory, clock driving circuitry, interface circuitry, user interface circuitry etc. Such circuitry may further be implemented as part of the processing unit, as integrated circuits, and/or as discrete electronic circuitry.

The processing circuit 203 is coupled to a rendering circuit 205 which is arranged to render an audio signal representing the audio source, and typically also a number of other audio sources to provide a rendering of an audio scene. The rendering circuit 205 may specifically receive audio data characterizing the audio from the original sound source and may render this in accordance with any suitable rendering approach and technique. The rendering of the original sound source may include the generation of reflected audio based on the reflection model generated by the processing circuit 203. In addition, signal components for the original sound source corresponding to the direct path and reverberation will typically also be rendered. The person skilled in the art will be aware of many different approaches for rendering audio (including for spatial speaker configurations and headphones, e.g. using binaural processing) and for brevity these will not be described in further detail.

The rendering circuit 205 may be implemented in any suitable form including e.g. using discrete or dedicated electronics. The rendering circuit 205 may for example be implemented as an integrated circuit such as an Application Specific Integrated Circuit (ASIC). In some embodiments, the circuit may be implemented as a programmed processing unit, such as for example as firmware or software running on a suitable processor, such as a central processing unit, digital signal processing unit, or microcontroller etc. It will be appreciated that in such embodiments, the processing unit may include on-board or external memory, clock driving circuitry, interface circuitry, user interface circuitry etc. Such circuitry may further be implemented as part of the processing unit, as integrated circuits, and/or as discrete electronic circuitry.

The processing circuit 203 is specifically arranged to generate a mirror source model for the reflections. In a mirror source model, reflections are modelled by separate virtual sound sources where each virtual sound source is a replicate of the original sound source and has a (virtual) position that is outside of the original room but at such a position that the direct path from the virtual position to a listening position exhibits the same properties as the reflected path from the original sound source to the listening position. Specifically, the path length for the virtual sound source representing a reflection will be equal to the path length of the reflected path from the original source to the listening position. Further, the direction of arrival at the listening position for the virtual sounds source path will be equal to the direction of arrival for the reflected path. Further, for each reflection by a boundary (e.g. wall) for the reflected path, the direct path will pass through a boundary corresponding to the reflection boundary. The transmission through the model boundary can accordingly be used to directly model the reflection effect, for example an attenuation corresponding to the reflection attenuation for the boundary may be assigned to the transmission through the corresponding model boundary.

A particularly significant property of the mirror source model is that it can be independent of the listening position. The determined positions and room structures are such that they will provide correct results for all positions in the original room. Specifically, virtual mirror sound sources and virtual mirror rooms are generated, and these can be used to model the reflection performance for any position in the original room, i.e. they can be used to determine path length, reflections, and direction of arrival for any position in the original room. Thus, the generation of the mirror source model may be done during an initialization process and the generated model may be used and evaluated continuously and dynamically as e.g. the user is considered to move around (translation and/or rotation) in the original room. The generation of the mirror source model is thus performed without any consideration of the actual listening position but rather a more general model is generated.

Figure 3:
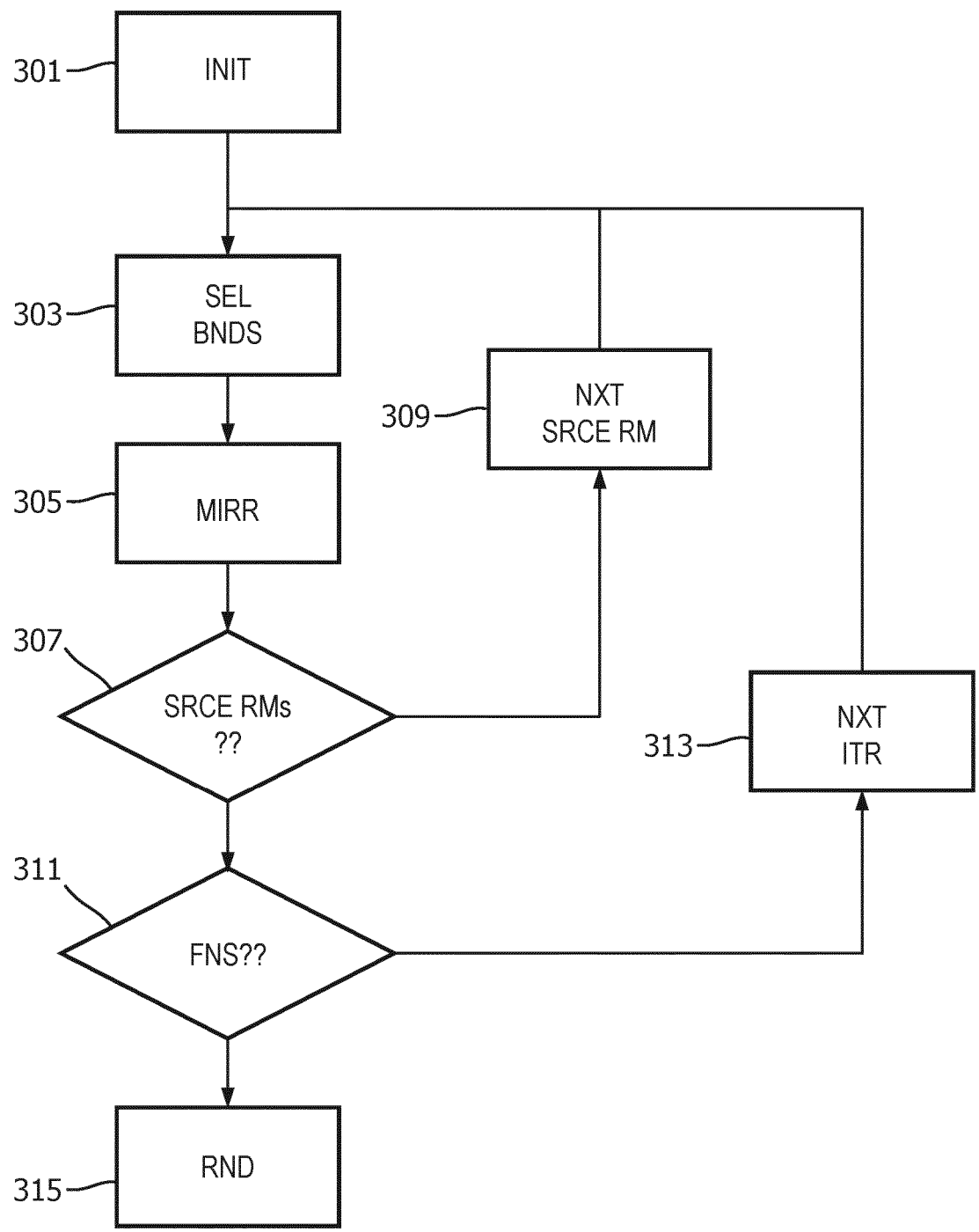
FIG. 3 illustrates an example of elements of method accordance with some embodiments of the invention.

The process of generating the mirror source model is an iterative process and an example of the method for generating the model by generating virtual sound sources representing reflections is shown in FIG. 3.

The method starts in step 301 wherein the process is initialized. This includes for example initializing the method to use the specific properties of the room, i.e. to initialize the method to be based on the properties retrieved from the room data.

The process is based on an iterative mirroring of rooms around boundaries of those rooms and on the corresponding mirroring of sound sources around boundaries of rooms. In each iteration, new rooms and sounds sources are generated by mirroring rooms and sound sources (and specifically sound source positions) generated in the (immediately previous iteration) around (some of) the boundaries of the rooms generated in the previous iteration. When the process is initialized, the original room is initialized/considered to be a room of an immediately previous iteration and the original sound source is initialized/considered to be a sound source of an immediately previous iteration. Thus, the first iteration is based on considering the single original room and sound source as the outcome/result of an immediately previous iteration.

The first iteration starts in step 303 wherein a set of mirror boundaries are determined for a room that was generated in the previous iteration. Specifically, a set of source rooms are determined as the rooms that were generated in the previous iteration. For the first iteration, the set of source rooms comprises the original room (and only this). One of these source rooms is then processed in step 303.

All of the boundaries for the source room are initially candidate boundaries for the set of mirror boundaries and out of these none, one, some, or all may be selected to be included in the set of mirror boundaries. The selection will be described in detail later.

Step 303 is followed by step 305 in which a mirroring is performed around each boundary in the set of mirror boundaries (henceforth referred to as a mirror boundary). Each mirror comprises a mirroring of the source room around the mirror boundary. In addition, it includes a mirroring of the sound source of the source room around the mirror boundary. Thus, the mirroring around a mirror boundary generates a new (virtual) mirror room as well as a new (virtual) mirror sound source. The mirroring is accordingly of a source room and source sound source into a new mirror room and mirror sound source (being mirrored duplicates of the source room and source sound source respectively).

Mirroring of the source sound source can be done by determining a line going through the boundary and the source sound source such that the line is perpendicular to the surface of the boundary and then positioning the mirror sound source at the same distance from the boundary (but on the opposite side, i.e. in the mirror room).

The mirroring inherently defines a direction from one side of the mirror boundary to the other, i.e. a direction from the source room to the mirror room. The direction can be considered as the direction perpendicular to the mirror surface or equivalently the relative position of mirror boundary in the room can be considered to indicate the direction. The direction may for example be related to the original room. For example, the position of each boundary in the original room may be considered to represent a direction, i.e. six discrete directions may be defined for a 3D room and four discrete directions may be defined for a 2D room. As the mirror rooms are generated by mirroring, the alignments of the boundaries do not change and thus the boundaries of the mirror rooms also align with the four or six directions of the original room (although a mirroring of course reverses the relative position of the boundaries, e.g. the positions of the left and right boundaries reverse when mirroring around the left or right boundary).

In the first iteration, the original room is considered a mirror room of an immediately previous iteration and the original sound sources is considered a mirror sound source of an immediately previous iteration, and accordingly a set of mirror boundaries may be generated comprising boundaries of the original room. Typically, the set of mirror boundaries of the first iteration will include all boundaries of the original room.

Mirroring is then performed around the boundaries of the set of mirror boundaries, and this results in a number (typically up to four or six) new mirror rooms being generated, each comprising a new mirror sound source.

The method then continues in step 307, it is determined if all source rooms of the set of source rooms have been processed, i.e. if all the mirror rooms that were generated in the previous iteration have been processed. If not, the method proceeds in step 309 wherein the next source room is selected and the method then returns to step 303.

Otherwise it proceeds to step 311 wherein it is determined whether more iterations are to be performed. If so, the method continues to step 313 wherein the next iteration is set up, e.g. by determining a new set of source rooms comprising all the mirror rooms that were generated in the current iteration. The method then returns to step 303 wherein this new set of source rooms is processed and potentially mirrored. Thus, in each iteration, the number of mirror rooms/mirror sound sources is grown based on mirroring of the results of the previous iteration.

The iterations may for example continue until a predetermined number of iterations have been performed. If this is detected in step 311, the method may proceed to step 315 where the method may e.g. stop or where rendering based on the generated model e.g. may be performed.

The approach may generate a mirror source model where the reflections in the original room can be emulated by direct paths from the virtual mirror sound sources.

Figure 4:
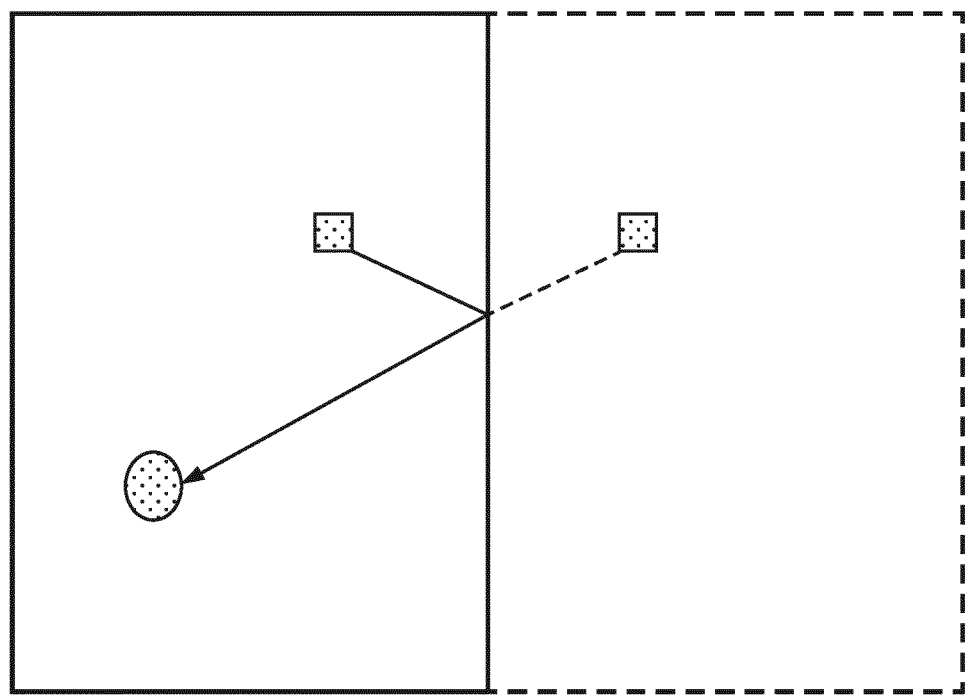
FIG. 4 illustrates an example of a mirroring to model an acoustic reflection of a boundary of a room.

As illustrated in FIG. 4, a reflected sound component can be rendered as the direct path of a mirrored sound source with this representing the correct distance and direction of incidence for the listener. This will be true for all the positions in the original room and no new mirror sound source positions need to be determined for different listening positions. Rather, the virtual mirror sources are valid for every user position within the original room.

When generating this virtual mirror source, the reflection effect may as mentioned be taken into account. This may typically be by assigning to each transition between rooms, an attenuation or frequency dependent filtering representing the portion of the sound source's energy that is specularly reflected by the surface of the boundary being crossed.

Figure 5:
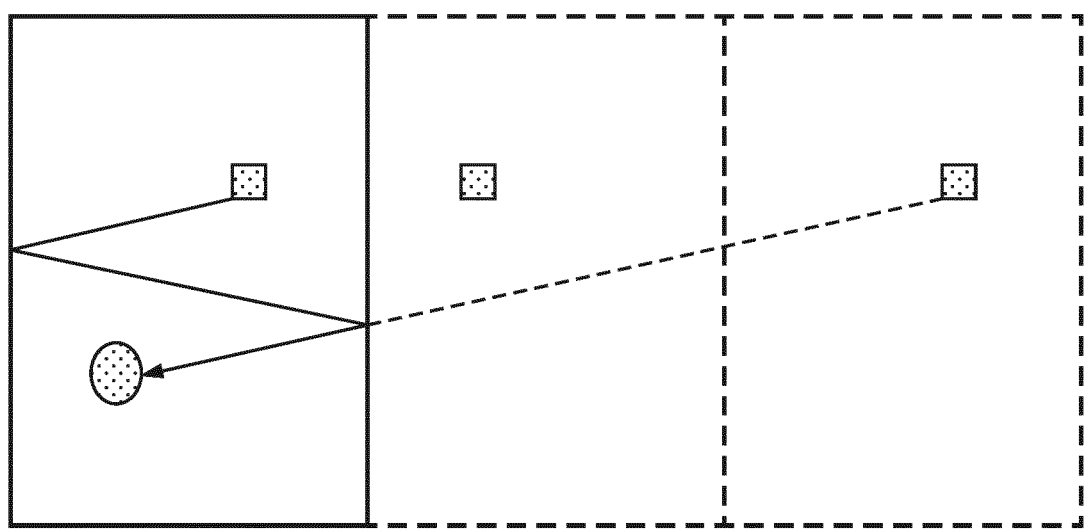
FIG. 5 illustrates an example of a mirroring to model acoustic reflection of two boundaries of a room.

As sound may reach the user through multiple boundary reflections, the approach can be repeated as illustrated in FIG. 5. The described iterative approach allows for multiple "layers" of mirror rooms and sources to be generated thereby allowing multiple reflections to be modelled. Each iteration increases the number of reflections of the path, i.e. the first iteration represents sound components reaching the listening position through one reflection, the second iteration represents sound components reaching the listening position through two reflections etc.

The approach typically results in a diamond-shaped representation of the original room and mirrored rooms when subsequently mirroring rooms until a certain order (fixed number of iterations). This is illustrated in 2D in FIG. 6 for up to the $2^{nd}$ order, i.e. with two iterations. In 3D there would be a similar structure when looking at a cross-section through the original room (i.e. the same pattern would be seen in a perpendicular plane through the row of five rooms).

However, whereas principles of the described approach may seem relatively straightforward, the practical implementation is not and indeed the practical considerations are critical to the performance of the approach.

For example, in many applications, the coordinate system used to represent the room and sound source may not be aligned with the directions of the boundaries. This makes the mirroring less straightforward to calculate as it impacts more than one dimension at a time. In such a cases, either the room boundaries and the sound sources have to be rotated to aligned with the coordinate system and all subsequently determined virtual mirror sources have to be rotated inversely, or the mirroring itself has to be performed in more than one dimension (e.g. using normal vectors of the boundary). In many situations, the latter approach will be more efficient.

A particular issue with the approach is that it tends to be resource demanding and specifically has a high computational resource requirement. The Inventor has realized that a substantial issue is that a high number of duplicate mirror rooms are generated, and that the high resource usage is not only due to the resource usage in performing the many mirror operations but also due to the requirement for post-processing of the resulting mirror rooms and mirror sound sources in order to identify and eliminate duplicates.

Figure 7:
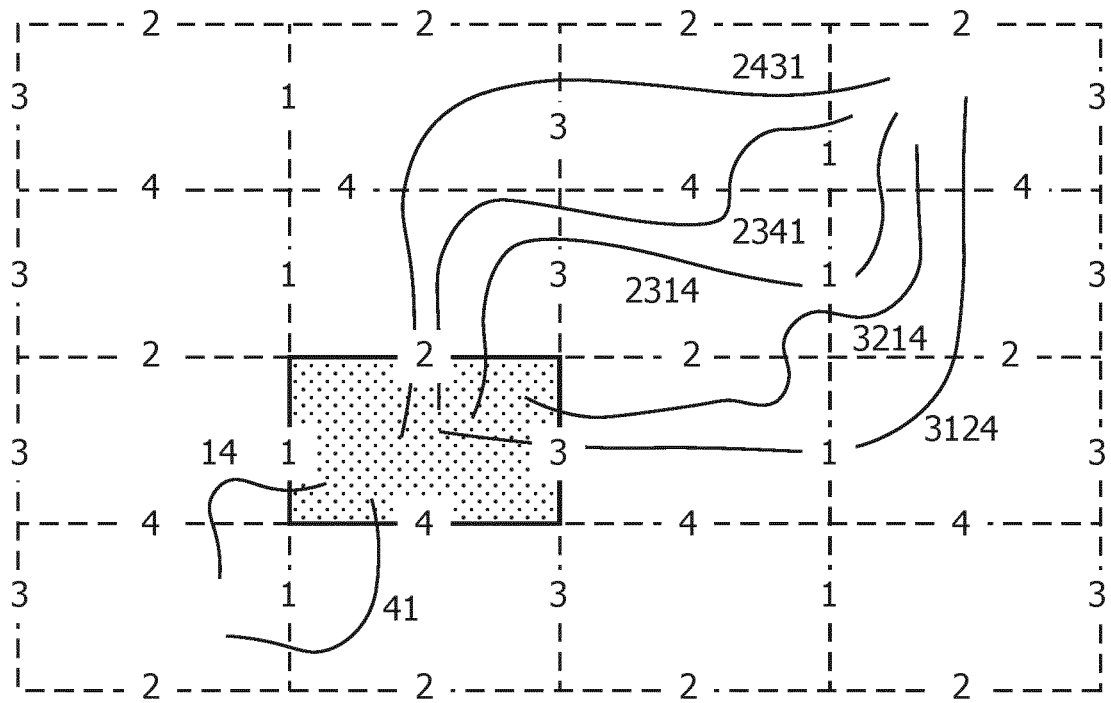
FIG. 7 illustrates an example of mirroring of rooms for an image source model for acoustic reflections in a room.

As an example, FIG. 7 illustrates 2D examples showing how $2^{nd}$ and $4^{th}$ order mirroring sequences result in duplication of mirror rooms. The relative number of duplicates grows progressively with the order of the reflections, and indeed for 3D rooms and fifth order reflections, up to 7776 virtual sources are found with the straightforward application of the image source method of which only 230 are unique.

In the method of FIG. 3, a specific approach is used to select boundaries for the set of mirror boundaries such that the generation of duplicate mirror rooms and mirror sound sources can be reduced and in most applications can be prevented completely.

The method is accordingly configured to choose a subset of room boundaries for subsequent mirrors of the original room and each mirrored room. The subsets for each room is chosen such that it does not result in duplicate rooms and therefore avoids any duplicate virtual mirror sources.

This is achieved by selecting the boundaries for the set of mirror boundaries in accordance with a selection criterion that includes a number of rules/constraints for the selection. The selection criterion is used to control the progression of mirroring of rooms/sound sources through the array of rooms within a certain amount of steps from the original room. The approach may specifically be seen as selecting one path to each (potential) mirror room and excluding all other paths to that room. As the different possible paths all cross corresponding boundaries, the different possible paths all include the same boundaries although in different orders. However, as reflections can typically be considered to be linear operations, the order in which they are reached from the sound source to the listener is not important, and thus the order of the boundaries being crossed do not matter.

The selection criterion may first be considered for a 2D application, which in the following will be considered to consider four directions, namely Up and Down which correspond to two pairwise parallel boundaries, and Backwards and Forwards which correspond to another two pairwise parallel boundaries (perpendicular to the first pair).

The selection criterion specifically includes a constraint/requirement that for a candidate boundary of the source room to be included in the set of mirror boundaries, a first direction of mirroring for the candidate boundary must not be in an opposite direction of a direction of mirroring for any previous mirroring leading to the source room.

Thus, the method may in step 303 e.g. sequentially consider all mirror rooms generated in the previous iteration as the source room for potential further mirroring. It may then for the currently considered source room evaluate all the boundaries for inclusion, e.g. for the 2D example it will consider all the walls of this source room, and for a 3D example it may further consider the ceiling and floor.

Further, (apart from the first iteration) the current source room is a mirror room that has been generated by a sequence of one or more mirrorings, and thus the current source room is linked to a sequence of one or more mirror directions reflecting which mirror operations have led to the source room.

The requirement then results in all boundaries of the source room which correspond to a mirror direction that is in the opposite direction to a direction that is already included in the sequence of past mirror directions are excluded for further consideration.

For example, if the source room has been generated by a sequence that includes a mirroring in the Up direction, then the boundary corresponding to a Down mirror direction is excluded from being selected for the set of mirror boundaries. Similarly, if the prior direction sequence includes a mirroring in the Forward direction, then a boundary corresponding to a Backward mirror direction is excluded.

Thus, considering the sequential generation of the mirror rooms through a path/sequence of mirrorings, once a mirroring has been performed in a given direction, no mirroring is allowed in the opposite direction.

The selection criterion further comprises a requirement which relates to the direction of mirroring that was performed for the original room and which led to the current source room.

Specifically, each of the boundaries of the first room are linked to an excluded linked direction. The excluded direction for a given boundary is specifically one that is perpendicular to the direction of mirroring for that boundary. Thus, a boundary belonging to a first pair of parallel boundaries is an excluded mirror direction for a boundary belonging to a different pair of parallel boundaries. The two pairs of boundaries correspond to the two dimensions of a 2D application or to two dimensions out of three for a 3D case.

Specifically, four boundaries belonging to two pairs of parallel boundaries of the source room each have a linked excluded direction with the excluded direction for each boundary being a mirror direction for a boundary belonging to the other pair of parallel boundaries. Further, the four linked excluded directions for the four boundaries are all different and thus the four excluded directions correspond to the four mirror directions.

As a specific example, the linked directions may be as follows:

| Boundary Mirror Direction | Linked Excluded Direction |
|---|---|
| Forward | Right |
| Left | Forward |
| Backward | Left |
| Right | Backward |

The selection criterion includes a constraint/requirement that for the candidate boundary to be included in the set of mirror boundaries, the direction of mirroring for the candidate boundary must not be in an excluded direction where the excluded direction is dependent on a boundary of the first room around which mirroring leading to the source room was performed.

Thus, when the method in step 303 considers all the boundaries of a given source room in order to select the boundaries for the set of mirror boundaries, it specifically considers the first mirroring that was performed, i.e. the mirroring of the original room that eventually led to the current source room. It may then identify the excluded direction. For example, if the first mirroring was in the Forward direction, it determines that the linked excluded direction was Right. It then proceeds to exclude the boundary that has a mirror direction corresponding to the excluded direction.

The requirement then results in the boundary of the source room which corresponds to a mirror direction in the excluded direction is excluded for further consideration and will not be included in the set of mirror boundaries. Thus, no mirroring will be performed in the excluded direction.

For example, if the source room has been generated by a sequence that started by a mirroring in the Left direction, then the boundary corresponding to the Forward direction is excluded from being selected for the set of mirror boundaries, and thus the progression of generation of mirror rooms will always be in one direction for the dimension/boundary pair that correspond to the excluded direction.

The selection criterion further includes a constraint/requirement that for a candidate boundary to be included in the set of mirror boundaries, the direction of mirroring for the candidate boundary must not be the same direction as any previous direction of mirroring that has led to the source room, except for the direction of mirroring that led to the source room being generated in the immediately previous iteration.

Thus, the direction of mirroring for a mirror boundary must not be the same as direction in which a previous mirroring was performed, unless that direction is the same as the mirror direction that was applied in the previous iteration, i.e. unless it is the same direction as the one that was used to generate the source room itself.

Thus, the selection requirement is such that a direction of mirroring is never repeated unless it was also used in the previous iteration, i.e. unless it is a continuation of a mirroring in the given direction. Thus, the selection criterion includes a requirement such that a given mirroring sequence never returns to a previously applied mirroring direction that was then deviated from. Thus, once mirroring begins in a first direction, this may be continued for as long as desired but once a mirroring occurs in a different direction, the mirroring cannot return to the first direction. As mirroring in one direction excludes mirroring in the opposite direction, this leads to a situation wherein only one direction of mirroring is allowed for each dimension, and once the mirroring sequence switches from one dimension to mirroring in a direction of another dimension, then it cannot return to the first dimension, i.e. mirroring in one dimension is only possible in one direction and in a continuous sequence of mirrorings.

Thus, when the method in step 303 considers all the boundaries of a given source room in order to select the boundaries for the set of mirror boundaries, it specifically considers all the previous mirror directions that lead to the source room and it excludes all the boundaries that have a mirror direction the same as a previous mirror direction, except for the boundary having a mirror direction which is the same as the one of the mirroring generating the source room.

For example, the source room may have been generated by a sequence that started by a mirroring in the Forwards direction twice, then in the Left direction twice, corresponding to a sequence of (F, F, L, L). The requirement not to return to a previous mirror direction except the most recent one will then lead to an exclusion of the boundary with a Forwards mirror direction, but it will not exclude the boundary with a Left mirror direction.

The described constraints and requirements may closely interwork to ensure that the mirroring performed in step 305 does not generate any duplicate rooms (when considering the 2D application). In addition, it allows all the possible mirror rooms to be generated and thus may automatically result in all potential reflections (e.g. up to a given number of reflections) being modelled.

Specifically, in many embodiments, the set of mirror boundaries is selected to include all boundaries that meet the selection criterion. Thus, for any mirror room when being considered as a source room, the set of mirror boundaries is generated to include all the boundaries that are not excluded by the requirements. Typically, this includes one or two boundaries for the 2D case.

As previously mentioned, in the first iteration, the original room is considered as the only source room/mirror. Further, the set of mirror boundaries is generated to include all the boundaries of the original room. It is also noted that for the first iteration, there is no previous direction or excluded direction and thus all four boundaries will inherently meet the described criterion. Further, the first iteration will determine the excluded direction for each new mirror room.

Figure 8:
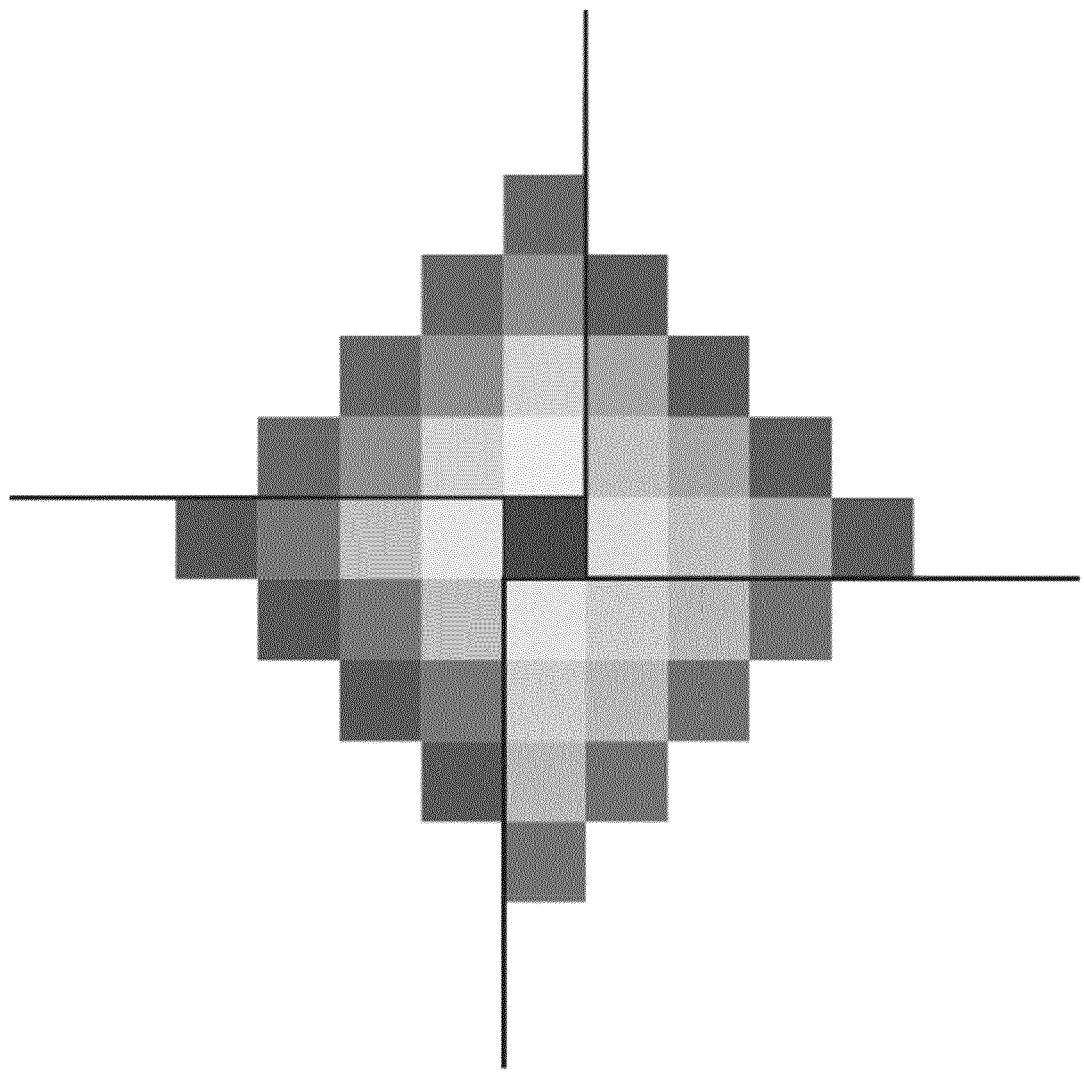
FIG. 8 illustrates an example of mirroring of rooms for an image source model for acoustic reflections in a room.

The selection requirements may interact closely and synergistically to allow a determination in a 2D plane of mirror rooms and virtual sources which represents all reflections up to a given order without any duplication. This may be illustrated by FIG. 8 which shows the rooms of a model generated by the described process after four iterations, i.e. representing up to fourth order reflections. The requirement introducing the excluded direction essentially divides the space into four quadrants and the other requirements ensure that each mirror room can only be reached through one specific sequence/path of mirroring. In addition, they provide for all of the possible mirror rooms to be generated.

The approach may in many embodiments be used to generate a 3D model and also include modelling of reflections that include e.g. the ceiling and floor of the original room.

In this case, the above requirements described with a focus on a 2D model will still be used but in addition the selection criterion may include a specific requirement to deal with the third dimension.

Specifically, the processing circuit 203 may comprise a requirement that if a second direction of mirroring for any previous mirroring leading to the source room is perpendicular to the excluded direction and to a mirror direction of the mirroring for the first room leading to the source room, then for the candidate boundary to be included in the set of mirror boundaries, the direction of mirroring for the candidate boundary must be the same as the second direction.

The previous requirements considered mainly a 2D scenario where each room had two pairs of parallel boundaries. However, in the more typical 3D case, each room also have a third pair of parallel boundaries around which mirroring can be performed. Thus, each set of mirror boundaries can also include additional boundaries in the two directions of the third dimension, such as specifically in the Up and Down direction corresponding to the ceiling and floor of the room. The previous requirements do not prevent any such mirroring from being performed from a room in the original 2D plane. Thus, for every new mirror room in the original 2D plane generated in the previous iteration, a new mirror room may be generated respectively above and below in the current iteration.

The previously described requirements operate in two dimensions and provide an approach of expanding the model in two dimensions by mirroring of previously generated rooms. Specifically, the requirements allow a mirroring to be performed in the two dimensions as long as the requirements are met, and this leads to a diamond coverage of the 2D plane. The 2D plane is determined by the direction for the first mirroring performed, i.e. the direction of the mirroring of the original room that led to the current source room being considered and by the excluded direction which is associated therewith.

In the specific case, the direction of the first mirroring is one of (Forward, Left, Backward, Right) and similarly the excluded direction is one of (Forward, Left, Backward, Right). The requirement thus considers whether any other mirror directions have previously been performed, i.e. whether there have previously been any mirrorings in other directions than these, i.e. whether there has been a mirroring in the Up or Down direction. If not, the requirement imposes no restrictions and thus it does not restrict any mirroring in the 2D plane, and nor does it restrict a first mirroring out of the 2D plane, i.e. it does not restrict a first Up or Down mirroring.

However, if a previous mirroring has been performed out of the 2D plane, i.e. if a first Up or Down mirroring has been performed, then the requirement poses the strict constraint that only a mirroring in the same direction can be performed. Thus, once a mirroring in the Up (or Down) direction has been performed, all subsequent mirrorings must be in the Up (or down) direction. Thus, once direction has changed out of the 2D plane, this direction must be maintained, and a change of direction is not allowed. Thus, the direction of the first step in a mirror sequence in a third dimension disallows any other direction following from this first step.

In some embodiments, the third dimension may not be specifically determined by the excluded direction and the direction of the first mirroring. Rather, the third dimension may simply be a designated reference dimension, and specifically may be a predetermined reference dimension. Since, a dimension represents mirroring around opposite boundaries, it represents directions of mirroring in two directions, namely in opposite directions. Thus, the original room may be linked/associated with a pair of reference directions of mirroring that are in opposite directions. In the specific example, the pair of reference directions may specifically be the Up and Down directions.

In such an embodiment, the selection criterion may comprise a requirement that if a second direction of mirroring for any previous mirroring leading to the source room is in a direction that is one of the two reference directions of mirroring, then for the candidate boundary to be included in the set of mirror boundaries, the direction of mirroring for the candidate boundary must be the same as the second direction.

Thus, in such an embodiment, once a mirroring has been performed in a reference direction, specifically Up or Down in the example, then all subsequent mirrorings must be in the same direction. Thus, as soon as a mirroring in the Up direction has been performed, only the Up direction is possible for subsequent mirrorings and no mirroring in any other direction (whether Right, Left, Backwards, Forwards, or Down) can be performed.

This approach ensures that the method may generate a typically symmetric set of mirror rooms for modelling reflections in three dimensions. It may interact closely and synergistically with the previously described requirements to result in an efficient generation of a 3D model which may include accurate modelling of reflections yet have low complexity. In particular, a 3D model of mirror rooms can be generated without duplication. In addition, they provide for all of the possible mirror rooms to be generated.

The criterion used to determine how many iterations are performed may depend on the preferences and requirements of the individual application. In many embodiments, a predetermined number of iterations may be performed corresponding to a predetermined maximum number of reflections.

In other embodiments, a more adaptive criterion may be used, such as for example the iterations being continued until the combined attenuation factor (the combined reflection factor) for all the generated mirror sound sources are below a threshold. Thus, for such an implementation, the iterations may be repeated until the reflected signal is considered so weak that it can be ignored.

It will be appreciated that any stop criterion may be used to generate a model with desired properties and/or to ensure that the process has desired properties. For example, the iterations may be continued until either all attenuation factors are below a threshold or a predetermined number of iterations have been performed.

In many embodiments, the generated model may be used to render an audio signal for the original sound source at a given listening position in the original room. Step 315 may specifically include a rendering by the renderer 205 based on the model generated in the previous step.

The rendering may specifically include determining audio components for each sound source corresponding to direct (non-reflected) paths from each source to the listening position. Further, for each path, the signal may be attenuated by an attenuation factor that is determined to correspond directly to the path length and a combined attenuation factor which corresponds to the combined attenuation by all boundaries crossed by the path. Furthermore, many embodiments may delay the signal by a delay which corresponds directly to the path length, simulating the time-of-flight from the (virtual) sound source to the listener, using a speed of sound to determine the delay from the path length. Thus, each audio component emulates one early reflection and the combined audio reaching the listening position can be generated by combining all the audio components (including that directly from the original source) plus optionally a late reverberation component (which may be generated using any suitable means, such as e.g. a Jot reverberator).

The rendering of audio components as direct, non-reflected propagation from the virtual sound sources provides an efficient emulation of reflections in the room/acoustic environment thereby allowing a rendering to be generated that is perceived as a natural and realistic sound.

It will be appreciated that many rendering algorithms are known, including spatial rendering algorithms using spatial speaker configurations or binaural processing for headphone reproduction), and that any suitable approach may be used.

As described, each boundary of the original room may be associated with acoustic properties, and specifically the room data may describe an attenuation or reflection factor for each boundary. The attenuation/reflection factor may specifically indicate an attenuation of an acoustic signal being reflected by the wall, i.e. it may indicate the level difference/ratio between an incoming audio signal and a reflected audio signal. The attenuation/reflection factor may be frequency dependent and for example may directly correspond to a frequency dependent filtering of the incoming audio signal.

The attenuation factor for a boundary will depend on the acoustic properties of the boundary, and specifically the material of the element making up the boundary. Some materials will result in a strong reflection (e.g. tiles) whereas other materials are more acoustically dead (e.g. shag carpet) and will attenuate the sound so that only a substantially smaller signal is reflected. This may be indicated by the attenuation factor.

For each virtual source, the path to the original room crosses a number of boundaries with the number being equal to the iteration in which the room was generated. Further, each boundary being crossed corresponds to/models a reflection in the real room. For example, a virtual sound source crossing two boundaries in order to reach the original room, models a path in the original room formed by two reflections. Further, the two reflections have attenuation factors, and when assigning these attenuation factors to the mirror boundaries, the attenuation factor for crossing a mirror boundary directly reflects the effect of the reflection that this models.

In many embodiments, a combined reflection/attenuation factor may be determined for each virtual sound source by combining the attenuation factors of the boundaries around which mirroring has been performed in order to generate the virtual mirror sound source and corresponding mirror room. Thus, a combined attenuation factor can be generated for a mirror sound source by combining attenuation factors for all boundaries included in mirroring leading to the mirror room comprising the mirror sound source.

Thus, this combined attenuation factor reflects the combined reflection attenuation of all reflections for the early reflection modelled by the virtual sound source. The combined attenuation factor may thus be used by the rendering to determine e.g. the signal level and/or frequency distribution for the audio component reaching the listening position. Further, this may be independent of the specific position of the listening position in the original room and thus only the distance dependent path loss attenuation needs to be specifically determined for the specific current listening position.

In some embodiments, the selection criterion may comprise a requirement that a combined attenuation factor for the source sound source combined with an attenuation factor for the mirror boundary must indicate an attenuation below a threshold. Thus, in order for a boundary to be accepted to be a mirror boundary to generate a new mirror room and mirror sound source, it is required that the attenuation of this mirror sound source will not be attenuated by more than a given amount. Thus, the mirroring progression is terminated when this results in a reflected path which attenuates the original sound source to an extent where it can be considered to not contribute to the perception of the original sound. This may result in reduced complexity and resource demands in many embodiments.

The use of an attenuation factor may also allow modelling of very specific scenarios. Specifically, it may allow efficient modelling of a room in which one (or more) boundaries are acoustically dead or transparent with no reflections being generated whatsoever.

Specifically, an acoustically non-reflective boundary may be represented by an attenuation factor which is indicative of complete attenuation, i.e. with no reflected signal being generated. Thus, for a non-reflective element forming a boundary, an attenuation factor of 100% may be assigned (corresponding to a reflection coefficient of zero). Accordingly, any virtual mirrored sound source generated by a sequence of mirrorings that includes this boundary as a mirror boundary will result in a combined attenuation factor of 100% and thus will not generate any audio component, corresponding to any reflected path that includes this boundary will not reach the listening position. Indeed, the approach of setting the attenuation factor to 100% attenuation may also be applied to a boundary that does not include any physical element, such as a missing wall or ceiling.

In many embodiments, this may be combined with the selection of the boundaries for the set of mirror boundaries not including boundaries that result in an attenuation factor below a given threshold such that any mirror sequence is stopped when it reaches a non-reflective wall.

In some embodiments, the threshold may be adaptive. For example, dependent on the order of the reflection, or dependent on the relative (current, time-limited) level of the original sound source signal.

The described approach may thus be used to generate an acoustic image source model for early reflections in a room by iteratively mirroring rooms around boundaries (e.g. walls) of rooms of the previous iteration. The boundaries around which to mirror in each iteration is determined by a specific selection criterion including requiring that mirror directions cannot be reversed, cannot be in an excluded direction, and cannot be repeated unless in a continuous series of mirrorings.

Figure 9:
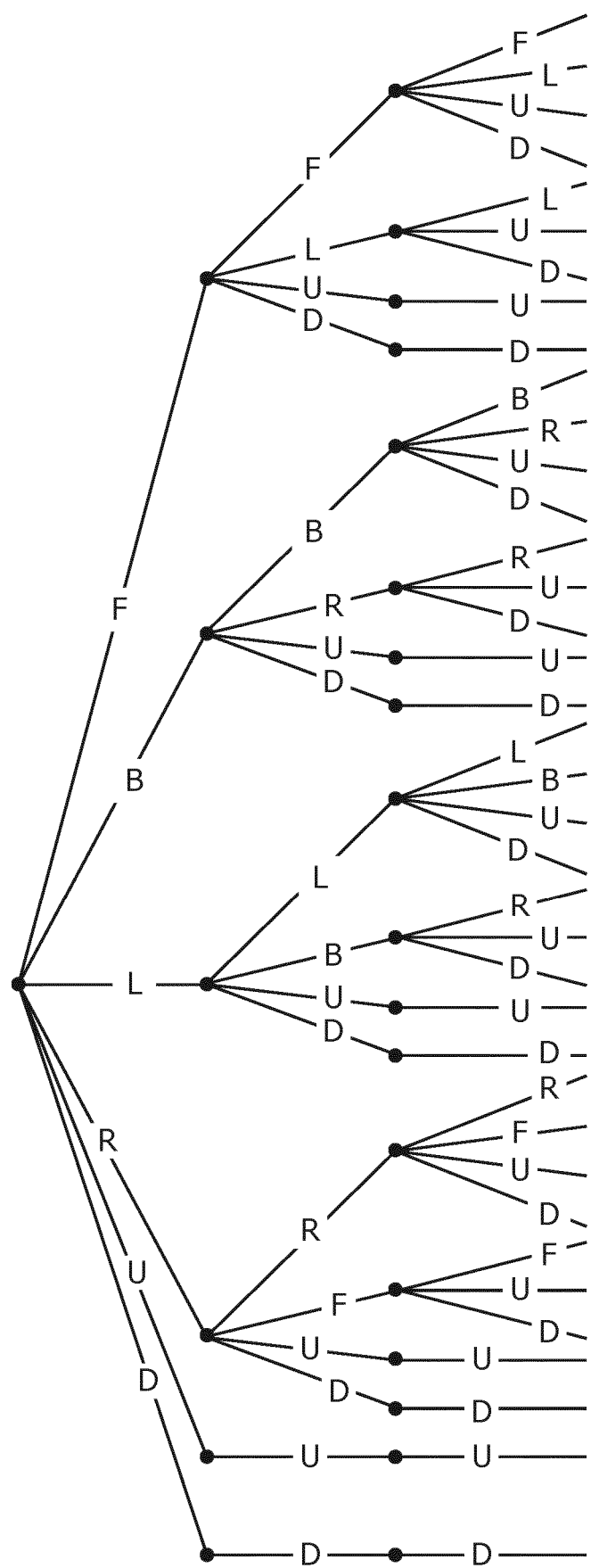
FIG. 9 illustrates an example of a tree representing an image source model generated by a method in accordance with some embodiments of the invention.

The approach may sequentially expand a model to include modelling of higher and higher order (i.e. more) reflections. An example of a tree representing the model is shown in FIG. 9 which shows a tree with representation of the algorithm's progression to find all the mirrored rooms for third order reflections (i.e. a tree depth of 3 mirroring iterations). In FIG. 9, the Up, Down, Left, Right, Forwards, and Backwards directions are represented by respectively U, D, L, R, F, and B. In this example, the dimensions and directions are represented by forward-backward, left-right and up-down. Each node in the graph represents a room, with the first node being the original room and the remaining nodes representing 62 mirrored versions of the original room.

The approach may allow a very efficient algorithm to be used to generate a model that may be highly accurate, and which may be used to render audio such that this is perceived as realistic and naturally sounding.

The approach may in particular reduce the computational complexity and/or the required computational resource requirement/usage. It may be implemented using less computational power than for typical applications. Specifically, in comparison to another approach for generating an image source model, it may typically reduce the number of mirror operations that are required to determine the mirrored virtual sound sources thereby substantially reducing the computational resource requirement. It may also avoid post-processing typically associated with having to resolve duplicate virtual sound sources. A much more efficient process can typically be achieved.

The described approach for generating an image source model may typically be part of an initialization component/routine that needs to be run at least once for a room and which derives a set of virtual mirror sources representing reflections of the original sound sources. In cases where sound sources are moving, the image source model may be recalculated, or partially recalculated for the one or more moving sources.

Thus, in many embodiments, the approach may be based on an iterative process with each process comprising two steps for each mirror room defined in the previous iteration. These steps may for a given room (a source room) include:
1. Determine a set of mirror boundaries across which the source room and at least one point in the room is to be mirrored to find higher order reflections.
2. Mirror the source room and at least one (source) position/sound source across each of the boundaries in the set of mirror boundaries, and update the combined reflection coefficient (attenuation factor) to include the reflection coefficient corresponding to the boundary mirrored across.

Many embodiments may perform the iterations with a recursive process, where the mirrored rooms are used as the source room for the next iterations. An example of a process in pseudo-code is provided in the following:

```
function [ reflectionList, reflectionAttList] = optimalImagesource (roomDef,
srcPos, reflectionAtt, state)
[mirrorBoundarySet, state] = getSetOfMirrorBoundaries (roomDef, state) ;
idx = 0;
for b = mirrorBoundarySet
idx = idx + 1;
    mirroredRoomDef(idx) = mirrorRoom (roomDef,
        roomDef.boundary (mirrorBoundarySet (b) ) );
    mirroredSrcPos(idx) = mirrorSrc (srcPos,
        roomDef.boundary (mirrorBoundarySet(b) ) );
    mirroredReflAtt (idx) = reflectionAtt * roomDef.reflectionCoeff (b);
end
reflectionList = mirroredSrcPos;
reflectionAttList = mirroredReflAtt;
state.order = state.order + 1;
if (state.order < state.maxOrder)
    for idx = 1:length (mirrorBoundarySet)
        [reflectionListPart, reflectionAttListPart] = optimalImageSource (
        mirroredRoomDef(idx), mirroredSrcPos (idx), mirroredReflAtt (idx),
state) ;
        reflectionList = concat (reflectionList, reflectionListPart);
        reflectionAttList = concat(reflectionAttList, reflectionAttListPart);
    end
end
``` which could be initialized and started with:
maxOrder=5;

```
state = initOptimalImagesource (maxOrder) ;
[reflectionList, reflectionAttList] =
optimalImageSource (roomDef,
    srcPos,
    1,
    state);
```

Figure 10:
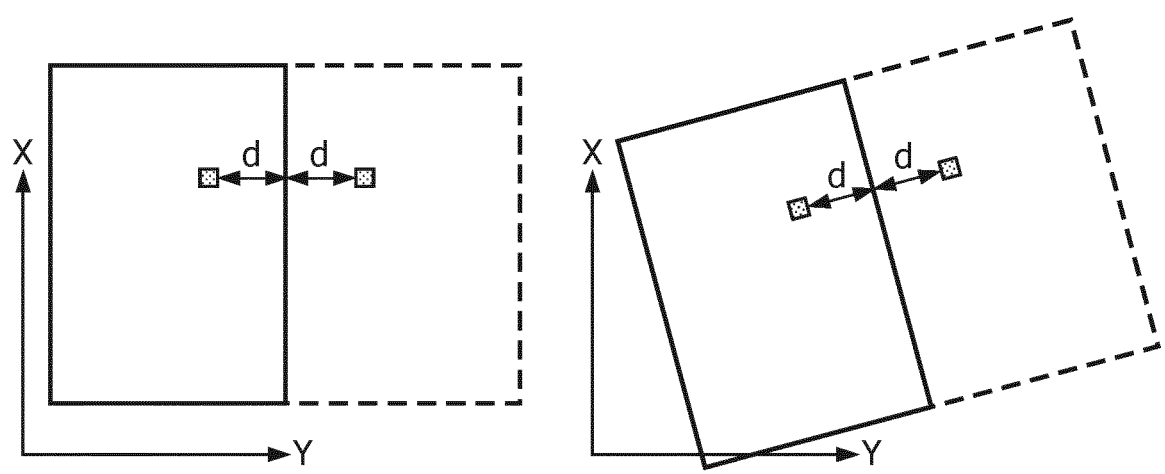
FIG. 10 illustrates an example of a mirroring to generate an image source model by a method in accordance with some embodiments of the invention.

Rooms are often rectangular (a.k.a. shoebox model) or can be approximated by a rectangular equivalent. The boundaries of such a rectangular room model are not necessarily aligned with the coordinate system in which they are defined as illustrated in FIG. 10.

This introduces two issues that complicate the image source method.
Mirroring points across boundaries are not straightforward subtraction and addition in a single dimension but affects measurements and adjustments in two or even three dimensions at the same time.
The three mirroring dimensions (forward-backward, left-right and up-down) of the source room do not map directly to the coordinate system.

One approach would be to align the room with the coordinate system by rotating every room definition coordinate and the source position coordinates, calculate the virtual sound source positions and rotate all these back with the inverse rotation.

Another approach would be to define the mirroring dimensions arbitrarily to the three parallel boundary pairs defining the room, and to perform the mirroring using geometry math.

Exemplary approaches based on the latter option will be described in the following.

As a first step, the three pairs of parallel boundaries defining the original room must be found and assigned to the three mirroring dimensions. This mapping can be arbitrarily chosen. No specific order is needed.

An exception to that is if the reflections are only calculated in the horizontal plane, e.g., in order to further reduce computational complexity. In that case, the floor and ceiling pair must be detected, which is possible by finding the boundaries of which the normal vectors are closest to the up-axis of the coordinate system. E.g. the boundaries for which the normalized normal vectors have the largest absolute dot product.

$$\max_a |\overline{N_a} \cdot i_z|$$

To find the pairs, the normal vector of each boundary is calculated (more detailed explanation in the section on mirroring points, below). A correlation matrix of all pairs of normal vectors allows finding the pairs and furthermore allows verification that the room model is rectangular.

Each element $c_{ij}=c_{ji}$ of the correlation matrix C, contains the dot product of the normal vectors of boundaries with indices i and j. All values should be very close to either 0, 1 or −1 for rectangular room definitions. Pairs for which the values are close to 1 or −1 are parallel pairs and can therefore be considered as one of the three dimensions along which to mirror.

As part of the process, the source room definition has to be mirrored across a plane defined by one of the source room's boundaries. Also mirroring of other positions inside the source room, e.g. a (reflection) sound source position, can be mirrored across the same plane.

Mirroring points across planes is a well-known mathematical procedure and can be performed using the normal vector of the plane. This vector, a direction vector, is perpendicular to all vectors inside the plane can be used to determine the point in the plane with the shortest distance to the point to be mirrored. This is the mirror point. Finding this point allows mirroring of the point to the opposite side of the plane by flipping the sign of the direction vector connecting the mirror point to the point to be mirrored, or by doubling the length of the direction vector connecting the point to be mirrored to the mirror point.

The normal vector of a plane can be derived from two vectors, or three points, in the plane. A particular advantageous way to define boundaries of a rectangular room is by defining the coordinates of the four corners of the (rectangular) boundary. Therefore, choosing three of these four coordinates is sufficient to calculate the normal vector.

In alternative representations, a room and its boundaries may be defined as a mesh with 3-point polygons. Similarly, the three vertices of one of the polygons defining a boundary can be used to calculate the normal vector.

With the three selected points in the plane denoted as: $\bar{p}$, $\bar{q}$ and $\bar{r}$, the normal vector is the vector which is orthogonal to two vectors defined by the points. E.g.:

$$\bar{V}=[v_1\ v_2\ v_3]=\bar{q}-\bar{p}$$

$$\bar{W}=[w_1\ w_2\ w_3]=\bar{r}-\bar{p}$$

Taking the cross-product of the two vectors results in this orthogonal normal vector.

$$\overline{N_s} = [n_1\ n_2\ n_3] =$$
$$\bar{V}\times\bar{W} = [v_2*w_3 - w_2*v_3\ \ v_3*w_1 - w_3*v_1\ \ v_1*w_2 - w_1*v_2]$$

As a means to reduce complexity in the further calculations the normal vector can be normalized.

$$\overline{N} = \frac{\overline{N_s}}{\sqrt{n_1^2 + n_2^2 + n_3^2}}$$

The result is a normalized direction vector starting in the origin, perpendicular to the (infinite) plane through the room boundary. The normal vector itself is not sufficient to define the plane. The plane's equation is:

$$\bar{N}\cdot\bar{m}=n_1m_1+n_2m_2+n_3m_3=d$$

for any point $\bar{m}$ in the plane. Hence, for example using any of the points $\bar{p}$, $\bar{q}$, or $\bar{r}$, value d can be calculated.

Next, the vector connecting the point to be mirrored ($\bar{s}$) to the mirror point ($\bar{u}$) can be calculated where $\alpha$ is used to scale the direction vector to the correct length and sign.

$$\bar{s}+\alpha\bar{N}=\bar{u}$$

Mirror point $\bar{u}$ must lie in the plane, therefore:

$$\bar{N}\cdot\bar{u}=\bar{N}\cdot(\bar{s}+\alpha\cdot\bar{N})=d$$

Working this out results in:

$$\alpha=d-\bar{s}\cdot\bar{N}$$

With this approach the mirrored point (s') is found by calculating:

$$\bar{s}'=\bar{s}+2*\alpha*\bar{N}$$

In most embodiments, the attenuation resulting from the reflections are also calculated for each of the mirror sources. Thus, in many embodiments, for each mirroring operation, the reflection attenuation for the sources in the mirrored room is calculated and represented by a combination attenuation factor. In the following, the attenuation factors may be represented directly by reflection coefficients, but it will be appreciated that the attenuation may in many embodiments e.g. be frequency dependent.

The reflection attenuation of the source room is combined with the reflection coefficient of the boundary across which it was mirrored. The reflection coefficients of the boundaries may be broadband or frequency dependent. E.g. the attenuation factor may be represented by FIR/IIR filter coefficients or attenuation coefficients in frequency bands/bins. For example:

$$reflAtt(f)=reflAttIn(f)*reflCoeff(mirrorBoundIdx,f)$$

Reflection coefficients may not necessarily be uniform across the entire boundary. In those cases, the used reflection coefficients could be made uniform for the entire boundary by calculating an average reflection coefficient over the surface of the room boundary. Similarly, an average for all the boundaries of the room could be calculated.

In more accurate embodiments, the mirror point in the boundary plane ($\bar{u}$) can be calculated for each mirrored sound source position and used to determine which reflection coefficient is applicable for that source.

Following the rules outlined earlier, a subset of the (typically) six boundaries is selected as a set of mirror boundaries for every source room in the iterative process. In each iteration, each mirror room generated by the (immediately) previous iteration may be considered a source room, i.e. each just created mirror room may be evaluated for potential further mirroring in the next iteration.

Each boundary of the original room designates/represents a direction (e.g. the direction of the normal vector for the boundary and outwards from the room). As the boundaries are pairwise parallel, each pair of boundaries define one dimension with two directions, (corresponding to the two boundaries defining the mirroring dimension).

For example, the pairs of parallel boundaries may be represented by (where $b_i$ represents boundary i):

$$D_1=[b_1,b_5]$$

$$D_2=[b_2,b_4]$$

$$D_3=[b_3,b_6]$$

In the first iteration (i.e. generating the first order reflection), all directions are allowed, so the set of mirror boundaries for the source room corresponding to the original room contains all boundaries of the source room. This results in six (or four in the case of 2D modelling) branches from which further iterations calculate higher order reflections, e.g. B=[$b_1$, $b_5$, $b_2$, $b_4$, $b_3$, $b_6$]. Thus, six new mirror rooms and six new mirror sound sources are generated in the first iteration.

Figure 6:
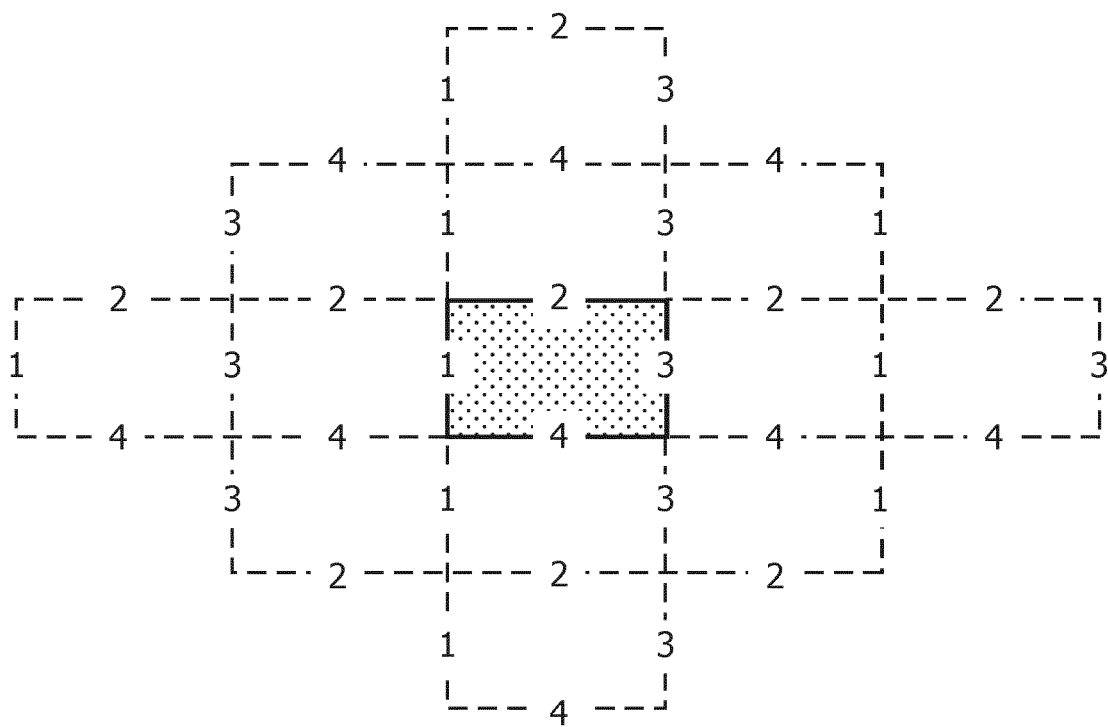
FIG. 6 illustrates an example of mirroring of rooms for an image source model for acoustic reflections in a room.

In any of these branches (e.g. after mirroring over boundary $b_4$), the next (i.e. second) iteration may continue in the same direction with respect to the original room. This corresponds to a mirror across the other boundary in the corresponding dimension boundary pair (since it is a mirroring over a boundary of a room generated by mirroring the original room). In this example $b_2$. This alternation of boundaries in each dimension is also shown in FIGS. 6 and 7.

Depending in the dimension along which the previous iteration in the branch went, the directions may be more limited. E.g. if the previous step was along the first dimension, only a single direction of the second dimension is allowed by virtue of the excluded direction which is in a second dimension. However, as directions have only been in two dimensions, both directions of the third dimension are acceptable. For example, when going in a first direction of the first dimension, the excluded direction associated therefore results in that in the second dimension only a first direction is allowed, and when going in the second direction of the first dimension, only a second direction of the second dimension is allowed.

In the same example, when the first step was going in the first direction of the second dimension, only the second direction of the first dimension is allowed and when the first step was going in the second direction of the second dimension only the first direction of the first dimension is allowed. This inverse relation between the allowed direction in the second step depending on whether the first step was in the first dimension (first-first, second-second) or in the second dimension (first-second, second-first) prevents the overlapping of mirrored rooms while not omitting mirrored rooms.

Still in the same example, if any mirroring step is along the third dimension, all subsequent mirrorings may only be in that direction, and not along any other directions or dimensions.

It should be clear that the notion of first-, second- and third dimension in the above does not have to relate to the order in which the dimension pairs have been defined and 'first', 'second' and 'third' may be interchanged, when related to the dimensions. Similarly, 'first' and 'second' may also be interchanged, when related to the directions within the dimensions. It is repeated that directions within dimensions are, in the above example, considered to be with reference of the original room, while the boundaries related to a certain direction in a dimension alternate with each mirroring step in that direction.

All branches that have changed dimension cannot go back to mirroring in an earlier dimension. E.g. a branch that in the first step mirrored in the second dimension and in the second step along the first dimension, may only continue to mirror in that direction of the first dimension, and any direction in third dimension.

Advanced embodiments may consider attenuation factors, such as reflection coefficients or total reflection attenuation, when determining the set of allowed directions. This may further reduce computational complexity. For example, if a certain direction is allowed according to the rules described above, but the reflection coefficient of the corresponding boundary is below a certain threshold (i.e. smaller than 0.05 or, alternatively, smaller or equal to −20 dB) the direction may be excluded from the set of mirror boundaries.

Additionally, or alternatively, a rule may be included that when the combined reflection attenuation is below a certain threshold (e.g. smaller than 0.02) the boundary is excluded.

For frequency dependent coefficients, the threshold may be frequency dependent, relate to a weighted average coefficient over all frequency bands, a maximum coefficient from all frequency bands or the coefficient related to a certain frequency (e.g. 1000 Hz).

Similarly, for reflection coefficients that differ between regions within the boundary, the threshold may apply to individual sound source positions or use an averaged reflection coefficient over the whole room boundary.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Generally, examples of a an apparatus and method for determining virtual sound sources are indicated by below embodiments.

EMBODIMENTS

1. A method of determining virtual sound sources representing reflections of a first sound source in a first room, the method comprising a computer performing the steps of:

receiving data describing boundaries of the first room and a sound source position for the first sound source in the room;

iteratively determining the virtual sound sources as mirrored sound sources by performing sound source mirroring of sound sources determined in a previous iteration, each iteration comprising, for each source room of a set of source rooms comprising mirror rooms determined in an immediately previous iteration, performing the steps of:

determining (303) a set of mirror boundaries for the source room;

for each mirror boundary of the set of mirror boundaries determining (305) a mirror room by mirroring the source room around the mirror boundary, and determining a mirror sound source by mirroring a source sound source around the mirror boundary, the source sound source being a mirror sound source of the source room, the mirroring having a direction of mirroring from the source room to the mirror room;

wherein the determining (303) of the set of mirror boundaries includes selecting boundaries of the source room in accordance with a selection criterion comprising:

a requirement that for a candidate boundary of the source room to be included in the set of mirror boundaries, a first direction of mirroring for the candidate boundary must not be in an opposite direction of a direction of mirroring for any previous mirroring leading to the source room;

a requirement that for the candidate boundary to be included in the set of mirror boundaries, the first direction must not be in an excluded direction, the excluded direction being dependent on a boundary of the first room around which mirroring leading to the source room was performed; and a requirement that for the candidate boundary to be included in the set of mirror boundaries, the first direction must not be in a same direction as any direction of mirroring for any previous mirroring leading to the source room except for a direction of mirroring of a mirroring generating the source room in the immediately previous iteration.

2. The method of claim 1 wherein the selection criterion comprises a requirement that if a second direction of mirroring for any previous mirroring leading to the source room is perpendicular to the excluded direction and to a mirror direction of the mirroring for the first room leading to the source room, then for the candidate boundary to be included in the set of mirror boundaries, the first direction must be the same as the second direction.

3. The method of claim 1 wherein the first room has a pair of reference directions of mirroring being in opposite directions, and the selection criterion comprises a requirement that if a second direction of mirroring for any previous mirroring leading to the source room is in a direction belonging to the pair of associated reference directions of mirroring, then for the candidate boundary to be included in the set of mirror boundaries, the first direction must be the same as the second direction.

4. The method of any previous claim wherein for a first iteration the first room is designated a source room of the set of source rooms for the first iteration.

5. The method of any previous claim wherein all boundaries of the first room are included in the set of mirror boundaries for the first iteration.

6. The method of any previous claim wherein each boundary of the first room is associated with an attenuation factor, and the method comprises determining a combined attenuation factor for each mirror sound source by combining attenuation factors for all boundaries included in mirroring leading to the mirror room comprising the mirror sound source.

7. The method of claim 6 wherein the selection criterion comprises a requirement that for the candidate boundary to be included in the set of mirror boundaries, a combined attenuation factor for the source sound source combined with an attenuation factor for the candidate boundary must indicate an attenuation below a threshold.

8. The method of claim 6 or 7 wherein the combined attenuation factor is frequency dependent.

9. The method of any of claims 6 to 8 wherein an attenuation factor for an acoustically non-reflective boundary is indicative of complete attenuation.

10. The method of any previous claim further comprising rendering (309) an audio signal for a listening position in the first room, the audio signal including at least one audio component representing audio from at least one mirror audio source arriving at the listening position.

11. The method of any previous claim wherein the set of mirror boundaries include all boundaries that meet the selection criterion.

12. The method of any previous claim wherein a predetermined number of iterations are performed.

13. The method of any previous claim wherein the first room is an orthotope.

14. An apparatus for determining virtual sound sources representing reflections of a first sound source in a first room, the apparatus comprising:
a receiver arranged to receive data (201) describing boundaries of the first room and a sound source position for the first sound source in the room;
a processing circuit (203) arranged to iteratively determine the virtual sound sources as mirrored sound sources by performing sound source mirroring of sound sources determined in a previous iteration, each iteration comprising, for each source room of a set of source rooms comprising mirror rooms determined in an immediately previous iteration, performing the steps of:
determining (303) a set of mirror boundaries for the source room;
for each mirror boundary of the set of mirror boundaries determining (305) a mirror room by mirroring the source room around the mirror boundary, and determining a mirror sound source by mirroring a source sound source around the mirror boundary, the source sound source being a mirror sound source of the source room, the mirroring having a direction of mirroring from the source room to the mirror room;
wherein
the determining of the set of mirror boundaries includes selecting boundaries of the source room in accordance with a selection criterion comprising:
a requirement that for a candidate boundary of the source room to be included in the set of mirror boundaries, a first direction of mirroring for the candidate boundary must not be in an opposite direction of a direction of mirroring for any previous mirroring leading to the source room;
a requirement that for the candidate boundary to be included in the set of mirror boundaries, the first direction must not be in an excluded direction, the excluded direction being dependent on a boundary of the first room around which mirroring leading to the source room was performed; and
a requirement that for the candidate boundary to be included in the set of mirror boundaries, the first direction must not be in a same direction as any direction of mirroring for any previous mirroring leading to the source room except for a direction of mirroring of a mirroring generating the source room in the immediately previous iteration.

15. A computer program product comprising computer program code means adapted to perform all the steps of claims 1-13 when said program is run on a computer.

1. A method of determining virtual sound sources representing reflections of a first sound source in a first room, the method comprising a computer performing the steps of:
receiving data describing boundaries of the first room and a sound source position for the first sound source in the room;
iteratively determining the virtual sound sources as mirrored sound sources by performing sound source mirroring of sound sources determined in a previous iteration, each iteration comprising, for each source room of a set of source rooms comprising mirror rooms determined in an immediately previous iteration, performing the steps of:
determining (303) a set of mirror boundaries for a source room of a/the current step;
for each mirror boundary of the set of mirror boundaries determining (305) a mirror room by mirroring the source room around the mirror boundary, and determining a mirror sound source by mirroring a source sound source around the mirror boundary, the source sound source being a mirror sound source of the source room, the mirroring having a direction of mirroring from the source room to the mirror room;
wherein
the determining (303) of the set of mirror boundaries includes selecting boundaries of the source room in accordance with a selection criterion comprising:
a requirement that for a candidate boundary of the source room to be included in the set of mirror boundaries, a first direction of mirroring for the candidate boundary must not be in an opposite direction of a direction of mirroring for any previous mirroring leading to the source room;

a requirement that for the candidate boundary to be included in the set of mirror boundaries, the first direction must not be in an excluded direction, the excluded direction being dependent on a boundary of the first room around which mirroring leading to the source room was performed; and a requirement that for the candidate boundary to be included in the set of mirror boundaries, the first direction must not be in a same direction as any direction of mirroring for any previous mirroring leading to the source room except for a direction of mirroring of a mirroring generating the source room in the immediately previous iteration.

1. A method of determining virtual sound sources representing reflections of a first sound source in a first room, the method comprising:

receiving data describing boundaries of the first room and a sound source position for the first sound source in the room;

iteratively determining the virtual sound sources as mirrored sound sources by performing sound source mirroring of sound sources determined in a previous iteration, each iteration comprising, for each source room of a set of source rooms comprising mirror rooms determined in an immediately previous iteration, performing the steps of:

determining (303) a set of mirror boundaries for the each source room;

for each mirror boundary of the set of mirror boundaries determining (305) a mirror room by mirroring the each source room around the mirror boundary, and determining a mirror sound source by mirroring a source sound source around the mirror boundary, the source sound source being a mirror sound source of the each source room, the mirroring having a direction of mirroring from the each source room to the mirror room;

wherein the determining (303) of the set of mirror boundaries includes selecting boundaries of the each source room in accordance with a selection criterion comprising:

a requirement that for a candidate boundary of the each source room to be included in the set of mirror boundaries, a first direction of mirroring for the candidate boundary must not be in an opposite direction of a direction of mirroring for any previous mirroring leading to the each source room;

a requirement that for the candidate boundary to be included in the set of mirror boundaries, the first direction must not be in an excluded direction, the excluded direction being dependent on a boundary of the first room around which mirroring leading to the each source room was performed; and a requirement that for the candidate boundary to be included in the set of mirror boundaries, the first direction must not be in a same direction as any direction of mirroring for any previous mirroring leading to the each source room except for a direction of mirroring of a mirroring generating the each source room in the immediately previous iteration.

More specifically, the invention is defined by the appended CLAIMS.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A method comprising:

receiving a data, wherein the data describes boundaries of a first room and a sound source position for a first sound source in the first room;

determining a at least one virtual sound source as a mirrored sound source by performing sound source mirroring of at least one previous sound source, wherein the previous sound source had been determined previously, wherein the determining of the at least one virtual sound source for each source room of a at least one source room comprises:

determining at least one mirror boundary for the source room;

determining a mirror room for each mirror boundary of at least one of mirror boundary by mirroring the source room around the mirror boundary, determining a mirror sound source by mirroring a source sound source around the mirror boundary, wherein the source sound source is a mirror sound source of the source room, wherein the mirroring has a direction of mirroring from the source room to the mirror room;

wherein the determining of the at least one mirror boundary comprises selecting boundaries of the source room in accordance with a selection criterion, wherein the selection criteria comprise a requirement that a candidate boundary of the source room is comprised within the at least one mirror boundary, wherein a first direction of mirroring for the candidate boundary is not in an opposite direction of a direction of mirroring for any previous mirroring leading to the source room, wherein the first direction is not in an excluded direction, wherein the excluded direction is dependent on a boundary of the first room around which mirroring leading to the source room was performed, wherein the first direction is not in a same direction as any direction of mirroring for any previous mirroring leading to the source room except for a direction of mirroring of a mirroring generating the source room in an immediately previous operation.

2. The method of claim 1, wherein the selection criterion comprises a requirement that if a second direction of mirroring for any previous mirroring leading to the source room is perpendicular to the excluded direction and to a mirror direction of the mirroring for the first room leading to the source room, then the candidate boundary is comprised within the at least one mirror boundary, if the first direction is the same as the second direction.

3. The method of claim 1,
wherein the first room has a pair of reference directions of mirroring,
wherein the each direction of the pair of reference directions is in opposite directions,
wherein the selection criterion comprises a requirement that if a second direction of mirroring for any previous mirroring leading to the source room is in a direction belonging to the pair of associated reference directions of mirroring, then the candidate boundary is comprised within the at least one mirror boundary, if the first direction is the same as the second direction.

4. The method of claim 1, wherein for a first use the first room is designated a source room of the at least one source rooms.

5. The method of claim 1, wherein all boundaries of the first room are comprised within the at least one mirror boundary.

6. The method of claim 1,
wherein each boundary of the first room is associated with an attenuation factor,
wherein the method comprises determining a combined attenuation factor for each mirror sound source by combining attenuation factors for all boundaries within mirroring leading to the mirror room comprising the mirror sound source.

7. The method of claim 6,
wherein the selection criterion comprises a requirement that the candidate boundary is comprised within the at least one mirror boundary,
wherein a combined attenuation factor for the source sound source combined with an attenuation factor for the candidate boundary indicates an attenuation below a threshold.

8. The method of claim 6, wherein the combined attenuation factor is frequency dependent.

9. The method of claim 6, wherein an attenuation factor for an acoustically non-reflective boundary is indicative of complete attenuation.

10. The method of claim 1, further comprising rendering an audio signal for a listening position in the first room, wherein the audio signal comprises at least one audio component representing audio from at least one mirror audio source arriving at the listening position.

11. The method of claim 1, wherein the at least one mirror boundary comprise all boundaries that meet the selection criterion.

12. The method of claim 1, wherein a predetermined number of repetitions of the determining of at least one the virtual sound source are performed.

13. The method of claim 1, wherein the first room is an orthotope.

14. An apparatus comprising:
a receiver circuit,
wherein the receiver circuit is arranged to receive data,
wherein the data describes boundaries of a first room and a sound source position for a first sound source in the first room;
a processing circuit, wherein the processing circuit is arranged to determine at least one virtual sound source as mirrored sound source by performing sound source mirroring of at least one previous sound source,
wherein the previous sound source had been determined previously,
wherein the determining of the at least one virtual sound source for each source room of a at least one source rooms comprises:
determining a at least one mirror boundary for the source room;
determining a mirror room by mirroring the source room around the mirror boundary,
determining a mirror sound source by mirroring a source sound source around the mirror boundary,
wherein the source sound source is a mirror sound source of the source room,
wherein the mirroring has a direction of mirroring from the source room to the mirror room;
wherein the determining of the at least one mirror boundary comprises selecting boundaries of the source room in accordance with a selection criterion,
wherein the selection criteria comprise a requirement that a candidate boundary of the source room is comprised within the at least one mirror boundary,
wherein a first direction of mirroring for the candidate boundary is not in an opposite direction of a direction of mirroring for any previous mirroring leading to the source room,
wherein the first direction is not in an excluded direction,
wherein the excluded direction is dependent on a boundary of the first room around which mirroring leading to the source room was performed; and
wherein the first direction is not in a same direction as any direction of mirroring for any previous mirroring leading to the source room except for a direction of mirroring of a mirroring generating the source room in the immediately previous operation.

15. The apparatus of claim 14, wherein the selection criterion comprises a requirement that if a second direction of mirroring for any previous mirroring leading to the source room is perpendicular to the excluded direction and to a mirror direction of the mirroring for the first room leading to the source room, then the candidate boundary is comprised within the at least one mirror boundary, if the first direction is the same as the second direction.

16. The apparatus of claim 14,
wherein the first room has a pair of reference directions of mirroring,
wherein the each direction of the pair of reference direction is in opposite directions,
wherein the selection criterion comprises a requirement that if a second direction of mirroring for any previous mirroring leading to the source room is in a direction belonging to the pair of associated reference directions of mirroring, then the candidate boundary is comprised within the at least one mirror boundary, if the first direction is the same as the second direction.

17. The apparatus of claim 14, wherein for a first use the first room is designated a source room of the at least one source rooms.

18. The apparatus of claim 14, wherein all boundaries of the first room are comprised within the at least one mirror boundary.

19. The apparatus of claim 14,
wherein each boundary of the first room is associated with an attenuation factor, wherein the method comprises determining a combined attenuation factor for each mirror sound source by combining attenuation factors for all boundaries within mirroring leading to the mirror room comprising the mirror sound source.

20. A computer program stored on a non-transitory medium, wherein the computer program when executed on a processor performs the method as claimed in claim 1.

* * * * *